US012683451B2

(12) United States Patent (10) Patent No.: US 12,683,451 B2
Miyata et al. (45) Date of Patent: Jul. 14, 2026

(54) STATOR OF ROTATING ELECTRIC MACHINE

(71) Applicant: KABUSHIKI KAISHA TOYOTA JIDOSHOKKI, Kariya (JP)

(72) Inventors: Tomoaki Miyata, Kariya (JP); Taku Adaniya, Kariya (JP); Shozo Hamana, Kariya (JP); Shuji Takimoto, Kariya (JP); Keisuke Isobe, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 202 days.

(21) Appl. No.: 18/782,210

(22) Filed: Jul. 24, 2024

(65) Prior Publication Data

US 2025/0038602 A1     Jan. 30, 2025

(30) Foreign Application Priority Data

Jul. 27, 2023     (JP) ................................. 2023-122508

(51) Int. Cl.
H02K 3/34 (2006.01)
H02K 1/16 (2006.01)
H02K 1/18 (2006.01)

(52) U.S. Cl.
CPC ............. H02K 3/345 (2013.01); H02K 1/165 (2013.01); H02K 1/18 (2013.01)

(58) Field of Classification Search
CPC ...... H02K 1/165; H02K 1/18; H02K 2203/12; H02K 3/325; H02K 3/345
See application file for complete search history.

(56) References Cited

U.S. PATENT DOCUMENTS

| | | | | | |
|---|---|---|---|---|---|
| 2012/0326554 A1* | 12/2012 | Kinpara | ................. | H02K 3/345 |
| | | | | 310/216.004 |
| 2015/0326097 A1* | 11/2015 | Kuwata | .................. | H02K 29/08 |
| | | | | 310/68 B |
| 2017/0179780 A1* | 6/2017 | Tsuiki | .................... | H02K 15/24 |
| 2020/0366149 A1* | 11/2020 | Walisko | ................. | H02K 3/345 |

FOREIGN PATENT DOCUMENTS

| | | |
|---|---|---|
| JP | 2003-047188 A | 2/2003 |
| JP | 2011-072128 A | 4/2011 |
| JP | 2020-188678 A | 11/2020 |

* cited by examiner

*Primary Examiner* — Naishadh N Desai
(74) *Attorney, Agent, or Firm* — Sughrue Mion, PLLC

(57) ABSTRACT

A stator of a rotating electric machine includes: a stator core including a yoke; an insulator having a plurality of insulator inner walls; a cover; a first insulating member; and a second insulating member. The cover has an insertion plate extending in an axial direction of the yoke. The insertion plate has a support surface that is located in a space between the insulator inner walls adjacent to each other in a circumferential direction of the yoke and located inward of the second insulating member to support the second insulating member in a radial direction of the yoke. The support surface is located outward of a slot opening in the radial direction of the yoke when viewed in the axial direction of the yoke.

5 Claims, 17 Drawing Sheets

AXIAL DIRECTION OF YOKE 24

FIG. 19

AXIAL DIRECTION OF YOKE 24

STATOR OF ROTATING ELECTRIC MACHINE

CROSS-REFERENCE TO RELATED APPLICATION

This application claims priority to Japanese Patent Application No. 2023-122508 filed on Jul. 27, 2023, the entire disclosure of which is incorporated herein by reference.

The present disclosure relates to a stator of a rotating electric machine.

BACKGROUND ART

A stator of a rotating electric machine includes a stator core, a coil, and an insulator, for example, as in Japanese Patent Application Publication No. 2011-072128. The stator core includes a yoke having a cylindrical shape and a plurality of teeth. Each of the plurality of teeth (i.e., a tooth) extends from an inner peripheral surface of the yoke inward in a radial direction of the yoke. The stator core has a slot between the teeth adjacent to each other in a circumferential direction of the yoke.

The tooth has a tooth extension portion and a tooth end portion. The tooth extension portion extends from the inner peripheral surface of the yoke. The tooth end portion extends from tooth side surfaces of the tooth extension portion, which define the tooth extension portion in the circumferential direction of the yoke, along the circumferential direction of the yoke. The coil is formed of a wire wound around the stator core. The stator core has a core end surface that defines the stator core in the axial direction of the yoke, and the coil has a coil end projecting from the core end surface. The insulator faces the core end surface of the stator core. The insulator electrically insulates the core end surface from the coil end.

The insulator has an insulator base portion having a cylindrical shape, a plurality of insulator extension portions, and a plurality of insulator inner walls. The insulator base portion is located outward of the coil end and overlaps the coil end in the radial direction of the yoke. Each of the insulator extension portions extends from an inner peripheral surface of the insulator base portion inward in the radial direction of the insulator base portion. The insulator extension portion overlaps the corresponding tooth extension portion in the axial direction of the yoke. Each of the insulator inner walls extends from the corresponding insulator extension portion, and is located inward of the coil end in the radial direction of the yoke such that the insulator inner wall overlaps the corresponding tooth end portion in the axial direction of the yoke and overlaps the coil end in the radial direction of the yoke. Such a stator of the rotating electric machine may include a cover facing the insulator.

The coil is formed of the wire that is wound around the tooth extension portion and the insulator extension portion through the slot. The stator includes a first insulating member and a second insulating member. The first insulating member extends along the inner peripheral surface of the yoke and the tooth side surfaces adjacent to each other in the circumferential direction of the yoke, and electrically insulates the stator core from the coil in the slot. The second insulating member is disposed crossing a slot opening between the tooth end portions adjacent to each other in the circumferential direction of the yoke. The second insulating member electrically insulates the tooth end portions from the coil.

In such a stator of the rotating electric machine, if the second insulating member is too close to the slot opening, it is difficult to secure an insulation distance between the tooth end portions and the coil. This may cause an occurrence of electric insulation failure between the tooth end portions and the coil. This may therefore decrease the reliability of the stator of the rotating electric machine.

The present disclosure, which has been made in light of the above described problem, is directed to providing a stator of a rotating electric machine that has an increased reliability.

SUMMARY

In accordance with an aspect of the present disclosure, there is provided a stator of a rotating electric machine. The stator includes: a stator core; a plurality of coils; an insulator; and a cover. The stator core includes a yoke having a cylindrical shape and has a core end surface defining the stator core in an axial direction of the yoke. The stator core includes a plurality of teeth each extending from an inner peripheral surface of the yoke inward in a radial direction of the yoke. The stator core has a slot between the teeth adjacent to each other in a circumferential direction of the yoke. Each of the plurality of teeth has: a tooth extension portion; and a tooth end portion. The tooth extension portion extends from the inner peripheral surface of the yoke and has tooth side surfaces that define the tooth extension portion in the circumferential direction of the yoke. The tooth end portion extends from the tooth side surfaces of the tooth extension portion along the circumferential direction of the yoke. Each of the plurality of coils is formed of a wire wound around the stator core. Each of the coils has a coil end projecting from the core end surface of the stator core. The insulator faces the core end surface of the stator core, and electrically insulates the core end surface from the coil end. The insulator has: an insulator base portion having a cylindrical shape and located outward of the coil end and overlapping the coil end in the radial direction of the yoke; a plurality of insulator extension portions each extending from an inner peripheral surface of the insulator base portion inward in a radial direction of the insulator base portion, and overlapping the corresponding tooth extension portion in the axial direction of the yoke; and a plurality of insulator inner walls each extending from the corresponding insulator extension portion. Each of the insulator inner walls is located inward of the coil end in the radial direction of the yoke such that the insulator inner wall overlaps the corresponding tooth end portion in the axial direction of the yoke and overlaps the coil end in the radial direction of the yoke. The cover faces the insulator. The coil is formed of the wire wound around the tooth extension portion and the insulator extension portion through the slot. The stator includes: a first insulating member that extends along an inner peripheral surface of the yoke and the tooth side surfaces adjacent to each other in the circumferential direction of the yoke, and electrically insulates the stator core from the coil in the slot; and a second insulating member that is disposed crossing a slot opening between the tooth end portions adjacent to each other in the circumferential direction of the yoke, and electrically insulates the tooth end portions from the coils. The cover has an insertion plate extending in the axial direction of the yoke. The insertion plate has a support surface that is located in a space between the insulator inner walls adjacent to each other in the circumferential direction of the yoke and located inward of the second insulating member to support the second insulating member in the radial direction of the yoke. The support surface is located outward of the slot opening in the radial direction of the yoke when viewed in the axial direction of the yoke.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which:

FIG. 19 is a sectional view of the insertion plate, the space-forming wall, the engagement piece, and the insertion recess for explaining the relationship among the insertion plate, the space-forming wall, the engagement piece, and the insertion recess.

DETAILED DESCRIPTION OF THE EMBODIMENTS

The following will describe an embodiment of a stator of a rotating electric machine with reference to accompanying FIGS. 1 to 19. The stator of the rotating electric machine according to the present embodiment serves as a part of an electric compressor. The electric compressor is used, for example, for a vehicle air conditioner.

Basic Configuration of Electric Compressor

Figure 1:
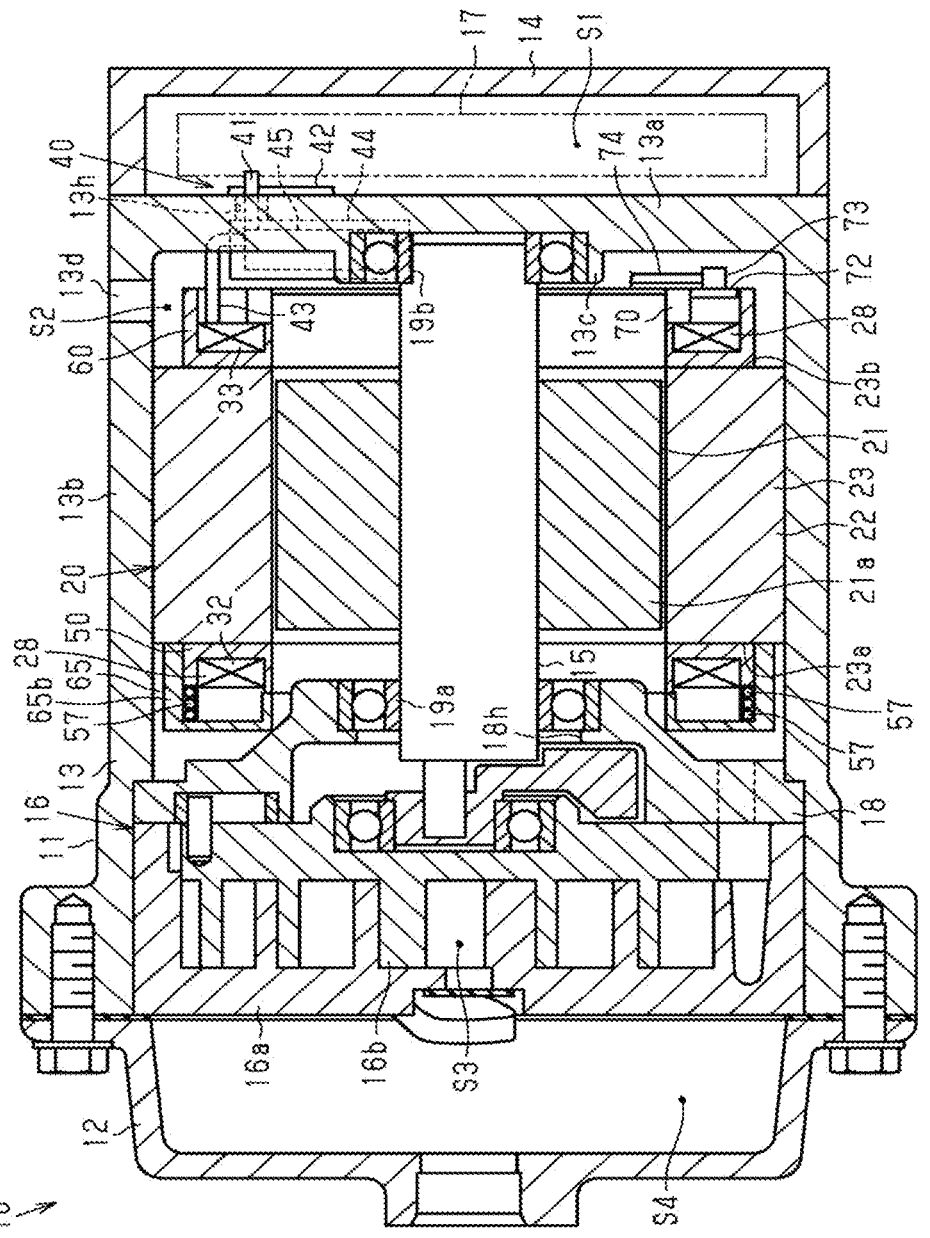
FIG. 1 is a sectional view of an electric compressor according to an embodiment of the present disclosure.

FIG. 1 illustrates an electric compressor 10 that includes a housing 11 having a cylindrical shape. The housing 11 includes a discharge housing 12, a motor housing 13, and an inverter case 14. The discharge housing 12, the motor housing 13, and the inverter case 14 are made of a metal material. For example, the discharge housing 12, the motor housing 13, and the inverter case 14 are made of aluminum.

The motor housing 13 includes an end wall 13a and a peripheral wall 13b. The end wall 13a has a plate shape. The peripheral wall 13b has a cylindrical shape and extends from an outer peripheral portion of the end wall 13a. The discharge housing 12 has a cylindrical shape. The discharge housing 12 is connected to an end of the peripheral wall 13b that is distant from the end wall 13a. The inverter case 14 has a cylindrical shape. The inverter case 14 is connected to the end wall 13a of the motor housing 13. The end wall 13a of the motor housing 13 and the inverter case 14 cooperate to define an inverter chamber S1.

The motor housing 13 has a boss 13c. The boss 13c has a circular cylindrical shape. The boss 13c protrudes from the center part of an end surface of the end wall 13a toward the peripheral wall 13b. The axis of the boss 13c corresponds to the axis of the peripheral wall 13b of the motor housing 13. The end wall 13a of the motor housing 13 has a hole 13h. The hole 13h penetrates the end wall 13a of the motor housing 13 in the thickness direction of the end wall 13a. The hole 13h is located between the boss 13c and the peripheral wall 13b.

The motor housing 13 has a suction port 13d. The suction port 13d is formed in a portion of the peripheral wall 13b adjacent to the end wall 13a. The inside and the outside of the motor housing 13 are connected via the suction port 13d. A fluid, specifically, refrigerant, is introduced into the motor housing 13 through the suction port 13d from the outside of the motor housing 13.

The electric compressor 10 includes a rotary shaft 15, a compression part 16, an inverter 17, and a rotating electric machine 20. The rotary shaft 15, the compression part 16, and the rotating electric machine 20 are accommodated in the motor housing 13. That is, the housing 11 accommodates the rotating electric machine 20. The axis of the rotary shaft 15 accommodated in the motor housing 13 corresponds to the axis of the peripheral wall 13b of the motor housing 13. The inverter 17 is accommodated in the inverter chamber S1.

The compression part 16 and the rotating electric machine 20 are arranged side by side in the axial direction of the rotary shaft 15. The rotating electric machine 20 is located between the compression part 16 and the end wall 13a of the motor housing 13. The compression part 16, the rotating electric machine 20, and the inverter 17 are arranged in this order in the axial direction of the rotary shaft 15.

The electric compressor 10 includes a shaft support member 18. The shaft support member 18 is disposed between the compression part 16 and the rotating electric machine 20. Accordingly, the shaft support member 18 serves as a partition between the rotating electric machine 20 and the compression part 16. The shaft support member 18 cooperates with the end wall 13a and the peripheral wall 13b of the motor housing 13 to define a motor chamber S2. Accordingly, the housing 11 has the motor chamber S2. The motor chamber S2 accommodates the rotating electric machine 20. The refrigerant is introduced into the motor chamber S2 through the suction port 13d.

The shaft support member 18 has an insertion hole 18h. The insertion hole 18h is located at the center of the shaft support member 18. The axis of the insertion hole 18h corresponds to the axis of the boss 13c. A first end of the rotary shaft 15 is inserted through the insertion hole 18h. A radial bearing 19a is disposed between the insertion hole 18h and the first end of the rotary shaft 15. The first end of the rotary shaft 15 is rotatably supported by the shaft support member 18 via the radial bearing 19a. A second end of the rotary shaft 15 is inserted in the boss 13c. A radial bearing 19b is disposed between the boss 13c and the second end of the rotary shaft 15. The second end of the rotary shaft 15 is rotatably supported by the boss 13c via the radial bearing 19b.

The compression part 16 includes a fixed scroll 16a and a movable scroll 16b. The fixed scroll 16a is fixed to the motor housing 13. The movable scroll 16b is disposed facing the fixed scroll 16a. The compression part 16 is driven by rotation of the rotary shaft 15. The compression part 16 is configured to compress the refrigerant. The fixed scroll 16a and the movable scroll 16b cooperate to define a compression chamber S3 with variable volume. The fixed 10) scroll 16a and the discharge housing 12 cooperate to define a discharge chamber S4. The refrigerant is compressed by the variation of the volume of the compression chamber S3, and discharged into the discharge chamber S4. The rotating electric machine 20 is configured to rotate the rotary shaft 15. The rotation of the rotary shaft 15 drives the compression part 16. The rotation of the rotary shaft 15 therefore causes the compression part 16 to compress the refrigerant.

Schematic Configuration of Rotating Electric Machine

The rotating electric machine 20 includes a rotor 21 and a stator 22. The stator 22 has a cylindrical shape. The rotor 21 is disposed inside the stator 22. The rotor 21 includes a rotor core 21a having a circular cylindrical shape, and a plurality of permanent magnets (not illustrated) disposed in the rotor core 21a. The rotor core 21a is fixed to the rotary shaft 15. The rotor core 21a is rotatable together with the rotary shaft 15.

Stator Core

The stator 22 includes a stator core 23. The stator core 23 is fixed to the inner peripheral surface of the peripheral wall 13b of the motor housing 13. The stator core 23 is fixed to the housing 11. For example, the stator core 23 is fitted in the inner peripheral surface of the peripheral wall 13b of the motor housing 13 by shrink fitting, so that the stator 22 is assembled to the housing 11. The axis of the stator core 23 corresponds to the axis of the rotary shaft 15. Accordingly, the axial direction of the stator core 23 corresponds to the axial direction of the rotary shaft 15.

Figure 2:
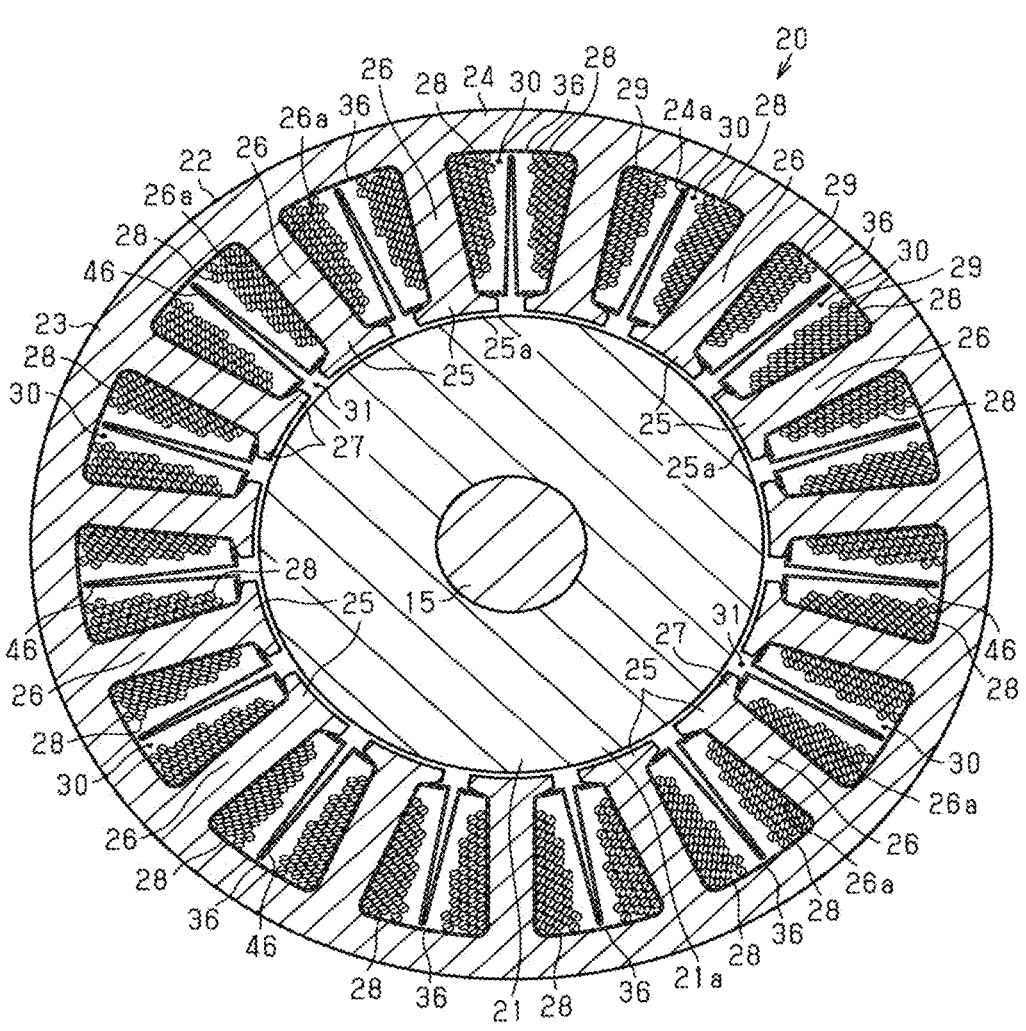
FIG. 2 is a sectional view of a rotating electric machine.
Figure 3:
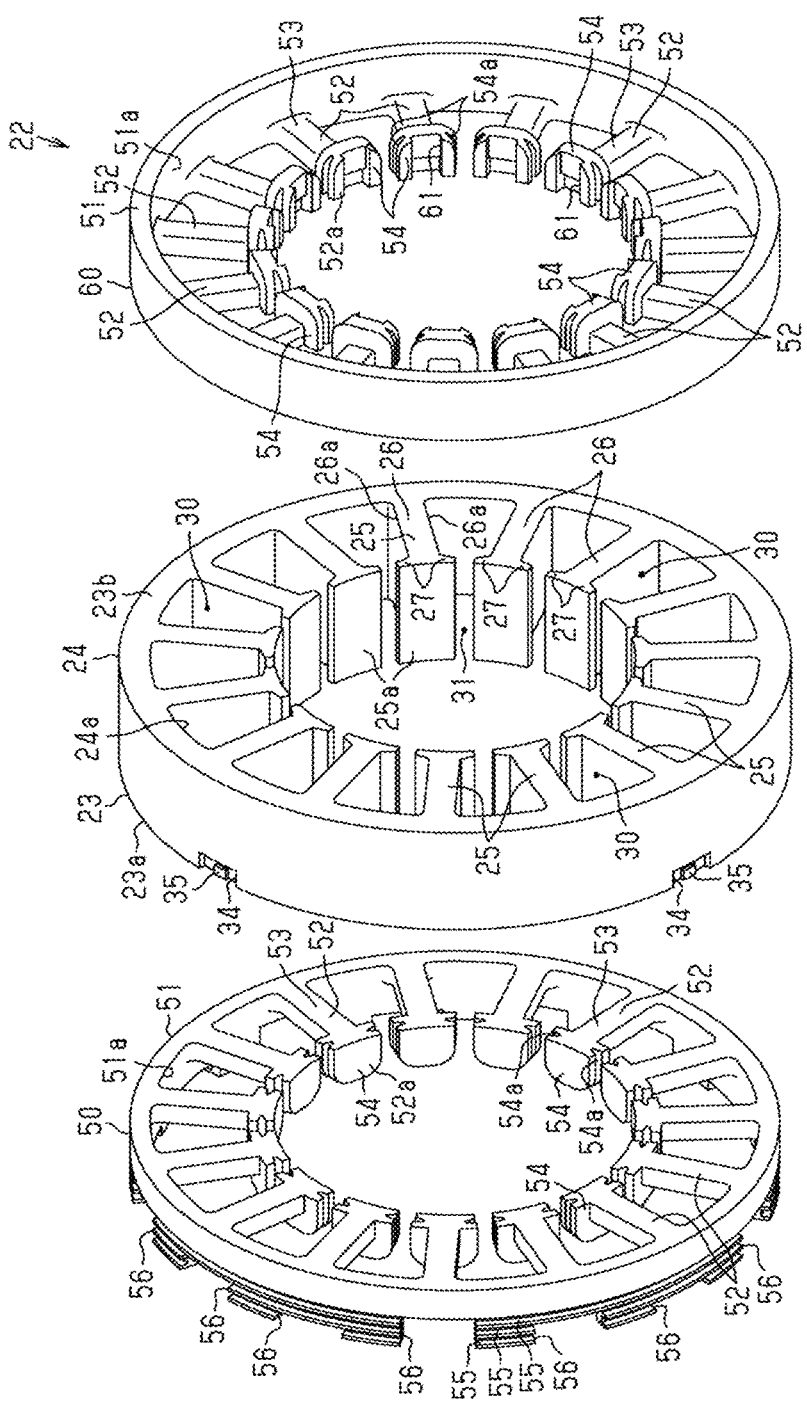
FIG. 3 is an exploded perspective view of a stator core, a first insulator, and a second insulator.

As illustrated in FIGS. 2 and 3, the stator core 23 includes a yoke 24 and a plurality of teeth 25. The yoke 24 has a circular cylindrical shape. The outer peripheral surface of the yoke 24 is fitted in the inner peripheral surface of the peripheral wall 13b of the motor housing 13, so that the stator core 23 is fixed to the motor housing 13. The axial direction of the yoke 24 corresponds to the axial direction of the stator core 23.

Each of the plurality of teeth 25 (i.e., a tooth 25) extends from an inner peripheral surface 24a of the yoke 24 inward in the radial direction of the yoke 24. The teeth 25 are spaced from each other (in this embodiment, equally spaced from each other) in the circumferential direction of the yoke 24. The circumferential direction of the yoke 24 corresponds to the circumferential direction of the stator core 23. Each of the teeth 25 (i.e., the tooth 25) extends from the inner peripheral surface 24a of the yoke 24 toward the axis of the stator core 23. According to the present embodiment, the stator core 23 includes fifteen teeth 25. The number of teeth 25 is not limited thereto, but the number of teeth is a multiple of three.

As illustrated in FIG. 3, the yoke 24 has flat end surfaces, which define the yoke 24 in the axial direction of the yoke 24. Each tooth 25 has flat end surfaces, which define the tooth 25 in the axial direction of the yoke 24. The length of the yoke 24 is equal to the length of the tooth 25 in the axial direction of the yoke 24. The one end surface of the yoke 24 and the one end surface of the tooth 25 are in the same plane. The other end surface of the yoke 24 and the other end surface of the tooth 25 are in the same plane.

The one end surface of the yoke 24 and the one end surface of the tooth cooperate to form a first core end surface 23a of the stator core 23 at one end of the stator core 23 in the axial direction of the yoke 24. The other end surface of the yoke 24 and the other end surface of the tooth 25 cooperate to form a second core end surface 23b of the stator core 23 at another end of the stator core 23 in the axial direction of the yoke 24. Accordingly, the stator core 23 has the first core end surface 23a and the second core end surface 23b. The first core end surface 23a and the second core end surface 23b define the stator core 23 in the axial direction of the yoke 24, and each of the first core end surface 23a and the second core end surface 23b serves as the core end surface of the present disclosure.

As illustrated in FIG. 1, in the motor housing 13, the first core end surface 23a and the second core end surface 23b of the stator core 23 respectively face the shaft support member 18 and the end wall 13a of the motor housing 13 in the axial direction of the rotary shaft 15.

As illustrated in FIGS. 2 and 3, the tooth 25 has a tooth extension portion 26 and a tooth end portion 27. The tooth extension portion 26 has a thin plate shape and extends from the inner peripheral surface 24a of the yoke 24. The tooth extension portion 26 also extends from the first core end surface 23a to the second core end surface 23b of the stator core 23. The tooth extension portion 26 has opposing tooth side surfaces 26a that define the tooth extension portion 26 in the circumferential direction of the yoke 24. Each of the tooth side surfaces 26a is continuous with the inner peripheral surface 24a of the yoke 24. The tooth end portion 27 extends from the tooth side surfaces 26a of the tooth extension portion along the circumferential direction of the yoke 24. The tooth end portion 27 extends from the distal end of the tooth extension portion 26 in opposite directions along the circumferential direction of the yoke 24.

The stator core 23 has a plurality of slots 30. Each of the slots 30 is formed between the teeth 25 adjacent to each other in the circumferential direction of the yoke 24. The slot 30 is defined by the inner peripheral surface 24a of the yoke 24, the tooth side surfaces 26a adjacent to each other in the circumferential direction of the yoke 24, and a surface of the tooth end portion 27 facing the yoke 24. The stator core 23 has a plurality of slot openings 31. Each of the slot openings 31 is formed between the tooth end portions 27 that are adjacent to each other in the circumferential direction of the yoke 24. The slot opening 31 is connected to the slot 30.

Figure 4:
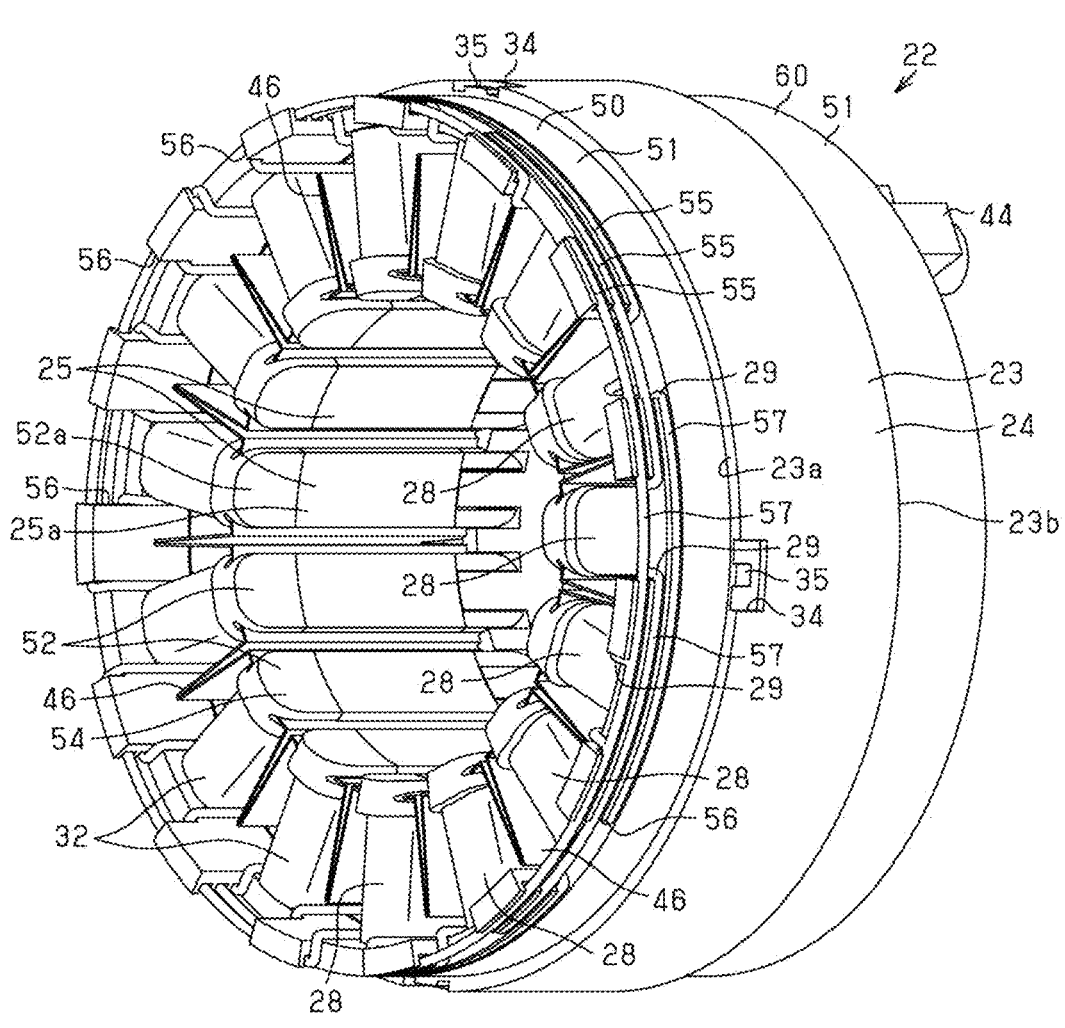
FIG. 4 is a perspective view of a stator without a first cover.
Figure 5:
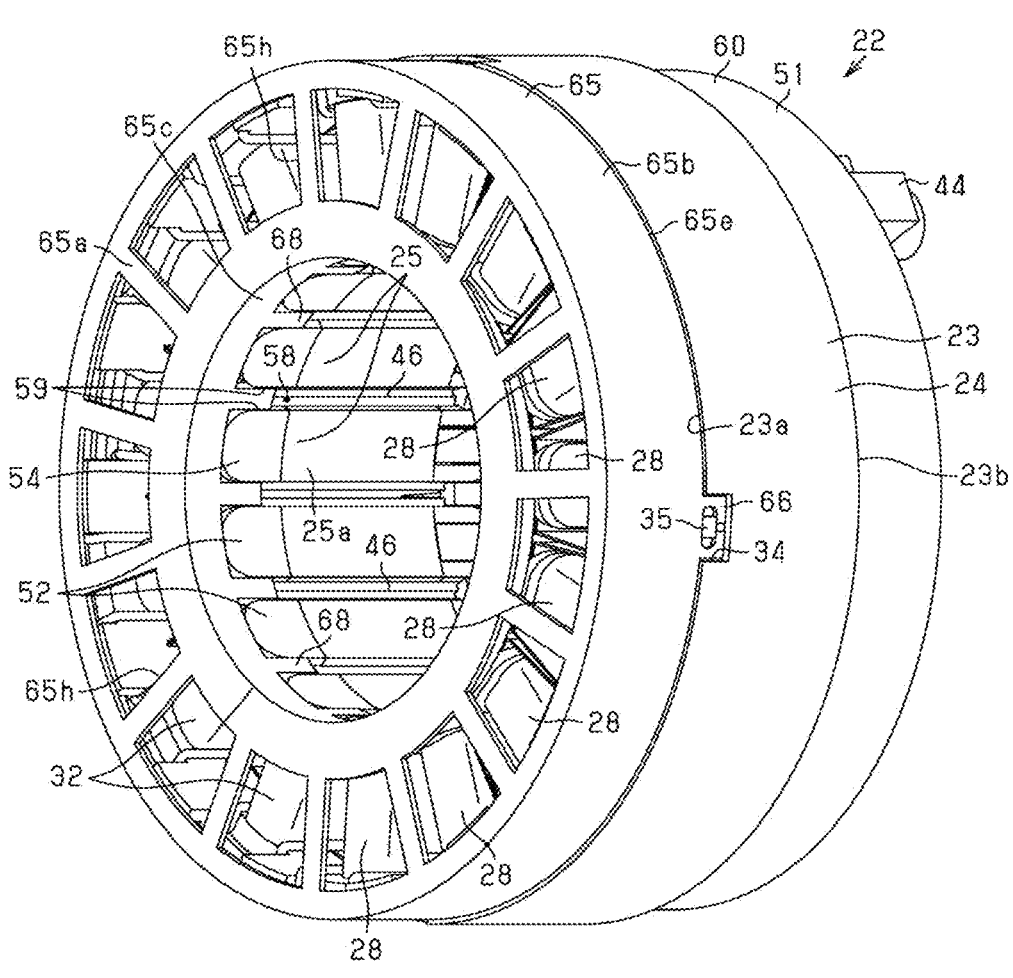
FIG. 5 is a perspective view of the stator with the first cover attached to the first insulator.

As illustrated in FIGS. 3, 4, and 5, the yoke 24 has a plurality of insertion recesses 34. The insertion recesses 34 are formed in the outer peripheral surface of the yoke 24. Each of the insertion recesses 34 is opened on the first core end surface 23a of the stator core 23. The insertion recesses 34 are equally spaced from each other in the circumferential direction of the yoke 24 on the outer peripheral surface of the yoke 24. In this embodiment, the yoke 24 has four insertion recesses 34, for example.

Figure 6:
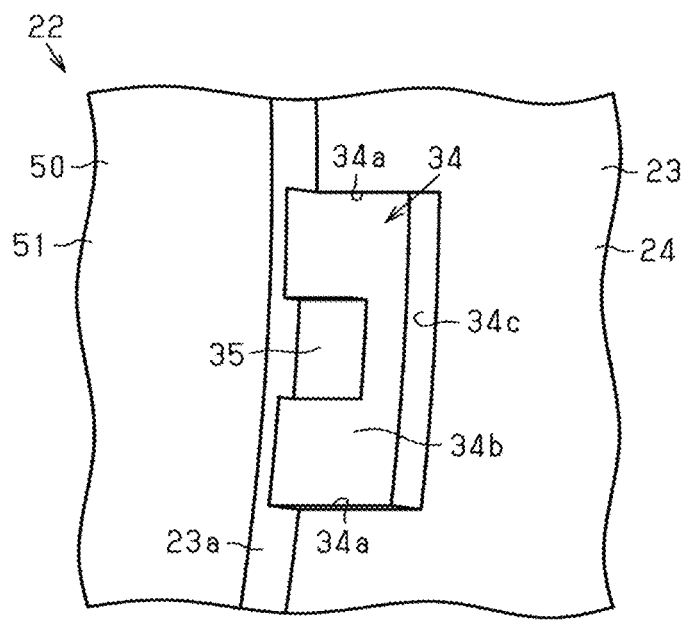
FIG. 6 is an enlarged perspective view of an insertion recess of a yoke and a protruding engagement portion.

As illustrated in FIG. 6, the insertion recess 34 is defined by a pair of side surfaces 34*a*, a connecting surface 34*b*, and a bottom surface 34*c*. The side surfaces 34*a* are opposing side surfaces of the insertion recess 34 in the circumferential direction of the yoke 24. The side surfaces 34*a* are continuous with the outer peripheral surface of the yoke 24. The side surfaces 34*a* are continuous with the first core end surface 23*a*. The side surfaces 34*a* extend 20) from the first core end surface 23*a* in the axial direction of the yoke 24 and are parallel to each other. Each of the side surfaces 34*a* is defined by radially opposing edges (i.e., inner edge and outer edge) in the radial direction of the yoke 24, and the radially inner edge of one of the side surfaces 34*a* is connected to the radially inner edge of the other of the side surfaces 34*a* by the connecting surface 34*b*. The connecting surface 34*b* is continuous with the first core end surface 23*a*. Each of the side surfaces 34*a* is also defined by opposing edges in the axial direction of the yoke 24, and one of the edges of the one side surface 34*a* axially distant from the first core end surface 23*a* is connected to one of the edges of the other side surface 34*a* axially distant from the first core end surface 23*a* by the bottom surface 34*c*. The connecting surface 34*b* is connected to the outer peripheral surface of the yoke 24 by the bottom surface 34*c*. The side surfaces 34*a* serve as the circumferential inner surfaces of the insertion recess 34 that define the insertion recess 34 in the circumferential direction of the yoke 24.

Each of the insertion recesses 34 has a first engagement portion, which, in this embodiment, is a protruding engagement portion 35. The protruding engagement portion 35 protrudes from the connecting surface 34*b* in the radial direction of the yoke 24. The protruding engagement portion 35 has a rectangular prism shape. In a planar view of the protruding engagement portion 35, the longitudinal direction of the protruding engagement portion 35 corresponds to the circumferential direction of the yoke 24. The protruding engagement portion 35 is 1 ( ) located away from the bottom surface 34*c*. The protruding engagement portion is also located away from the side surfaces 34*a*.

Insulator

As illustrated in FIG. 3, the stator 22 includes a first insulator 50 that serves as the insulator of the present disclosure. The first insulator 50 has a cylindrical shape. The stator 22 further includes a second insulator 60 that serves as the insulator of the present disclosure. The second insulator 60 has a cylindrical shape. The first insulator 50 and the second insulator 60 are made of, for example, a resin material.

The first insulator 50 and the second insulator 60 each have an insulator base portion 51 and a plurality of insulator teeth 52. The insulator base portion 51 has a circular cylindrical shape. The first insulator 50 and the second insulator 60 are disposed on the stator core 23 and each arranged such that the axis of the insulator base portion 51 corresponds to the axis of the yoke 24. Accordingly, the axial direction of the insulator base portion 51 corresponds to the axial direction of the yoke 24. The circumferential direction of the insulator base portion 51 corresponds to the circumferential direction of the yoke 24. The radial direction of the insulator base portion 51 corresponds to the radial direction of the yoke 24.

The first insulator 50 is disposed in contact with and facing the first core end surface 23*a* of the stator core 23. The second insulator 60 is disposed in contact with and facing the second core end surface 23*b* of the stator core 23. The outer diameter of the insulator base portion 51 is smaller than the outer diameter of the yoke 24. The insulator base portion 51 and the yoke 24 have the same inner diameter.

Each of the insulator teeth 52 extends from an inner peripheral surface 51*a* of the insulator base portion 51 inward in the radial direction of the insulator base portion 51. The insulator teeth 52 are spaced from each other (in this embodiment, equally spaced from each other) in the circumferential direction of the insulator base portion 51. Each of the insulator teeth 52 extends along the inner peripheral surface 51*a* of the insulator base portion 51 in the axial direction of the insulator base portion 51. In the present embodiment, the first insulator 50 and the second insulator 60 each have fifteen insulator teeth 52. The number of insulator teeth 52 is the same as the number of teeth 25 of the stator core 23.

Each of the insulator teeth 52 has an insulator extension portion 53. That is, the first insulator 50 and the second insulator 60 each have a plurality of insulator extension portions 53. Each of the insulator extension portions 53 has a columnar shape and extends from the inner peripheral surface 51*a* of the insulator base portion 51 inward in the radial direction of the insulator base portion 51. The insulator extension portion 53 and the tooth extension portion 26 have the same dimension in the circumferential direction of the insulator base portion 51 and the yoke 24. The insulator extension portions 53 are in contact with the teeth 25, respectively. Accordingly, each insulator extension portion 53 overlaps the corresponding tooth extension portion 26 in the axial direction of the yoke 24.

Each of the insulator teeth 52 has an insulator inner wall 54. That is, the first insulator 50 and the second insulator 60 each have a plurality of insulator inner walls 54. Each of the insulator inner walls 54 extends from the distal end of the insulator extension portion 53, which extends from the insulator base portion 51, along the direction of the insulator base portion 51. Specifically, the insulator inner wall 54 extends from the distal end of the insulator extension portion 53 in opposite directions along the circumferential direction of the insulator base portion 51, and extends in the axial direction of the insulator base portion 51 so as to become distant away from the stator core 23. In this way, the insulator inner wall 54 extends from the insulator extension portion 53. Each insulator inner wall 54 overlaps the corresponding tooth end portion 27 in the axial direction of the yoke 24.

Each of the insulator teeth 52 (i.e., the insulator tooth 52) extending from the insulator base portion 51 has a surface 52*a* at the distal end of the insulator teeth 52. The tooth 25 extending from the yoke 24 has a surface 25*a* at the distal end of the tooth 25. The surface 52*a* of the insulator tooth 52 and the surface 25*a* of the tooth 25 are in the same plane. The surface 52*a* of the insulator tooth 52 is formed of a surface of the insulator inner wall 54 facing away from the insulator base portion 51. The surface 25*a* of the tooth 25 is formed of a surface of the tooth end portion 27 facing away from the yoke 24. The thickness of the insulator inner wall 54 is greater than the thickness of the tooth end portion 27. Accordingly, the insulator inner wall 54 closes the slot 30 at a region adjacent to the tooth end portion 27 in the axial direction of the yoke 24.

The insulator inner wall 54 has a plurality of insertion grooves 54*a*. Specifically, in this embodiment, the insulator inner wall 54 has two insertion grooves 54 respectively in the opposing surfaces of the insulator inner wall 54 in the circumferential direction of the insulator base portion 51.

Each of the insertion grooves 54a is formed through the insulator inner wall 54 in the axial direction of the insulator base portion 51. The insertion groove 54a forms a space that serves as a part of a space between the insulator inner walls 54 adjacent to each other in the circumferential direction of the yoke 24.

The first insulator 50 has three guide grooves 55. The guide grooves 55 are arranged side by side in the axial direction of the first insulator 50. The guide grooves 55 are formed in the outer peripheral surface of the insulator base portion 51. The guide grooves 55 extend in the circumferential direction of the first insulator 50. The first insulator 50 has fifteen through grooves 56 corresponding to the three guide grooves 55. Specifically, the first insulator 50 has five through grooves 56 for each of the three guide grooves 55. The through grooves 56 are formed through the insulator base portion 51 in the radial direction.

The second insulator 60 has a plurality of insertion recesses 61. Each of the insertion recesses 61 is formed in the corresponding surface 52a of the insulator tooth 52. The insertion recess 61 is formed through the surface 52a of the insulator tooth 52 in the axial direction of the insulator base portion 51.

Figure 7:
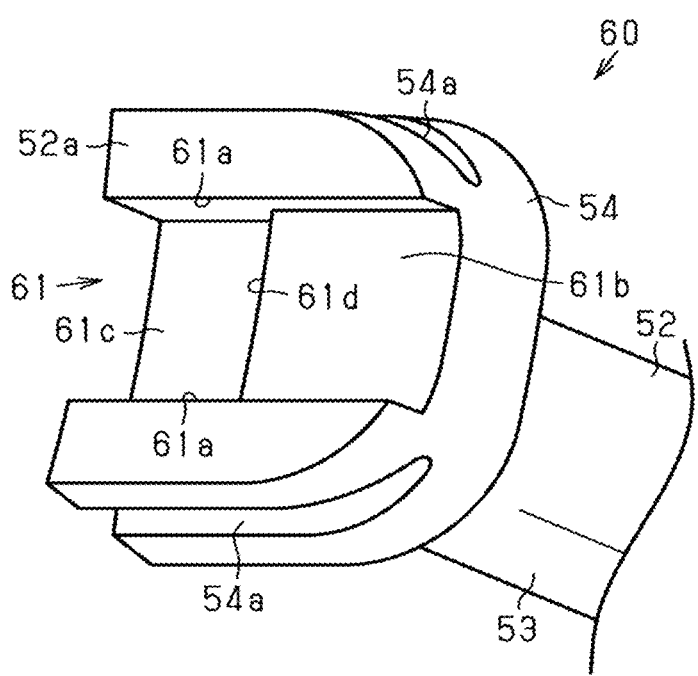
FIG. 7 is an enlarged perspective view of an insertion recess of the second insulator.

As illustrated in FIG. 7, the insertion recess 61 is defined by a pair of side surfaces 61a, a first connecting surface 61b, a second connecting surface 61c, and a third connecting surface 61d. The side surfaces 61a serve as the circumferential inner surfaces of the insertion recess 61 that define the insertion recess 61 in the circumferential direction of the yoke 24. The side surfaces 61a extend in the axial direction of the yoke 24 and are parallel to each other. The first connecting surface 61b, the second connecting surface 61c, and the third connecting surface 61d connect the side surfaces 61a. The first connecting surface 61b and the second connecting surface 61c extend in the axial direction of the yoke 24. The second connecting surface 61c is located radially outward of the first connecting surface 61b in the radial direction of the yoke 24. The second connecting surface 61c is located closer to the stator core 23 than the first connecting surface 61b. The third connecting surface 61d connects the first connecting surface 61b and the second connecting surface 61c. The third connecting surface 61d extends in the radial direction of the yoke 24.

Coil

As illustrated in FIG. 2, the stator 22 includes a plurality of coils 28. The coils 28 of the stator 22 each correspond to any of the U phase, the V phase, and the W phase. Accordingly, the stator 22 includes the plurality of coils 28 for a plurality of phases. Each of the coils 28 is formed by concentrated-winding a wire 29 around the stator core 23. The coil 28 partly passes through the slot 30.

Figure 8:
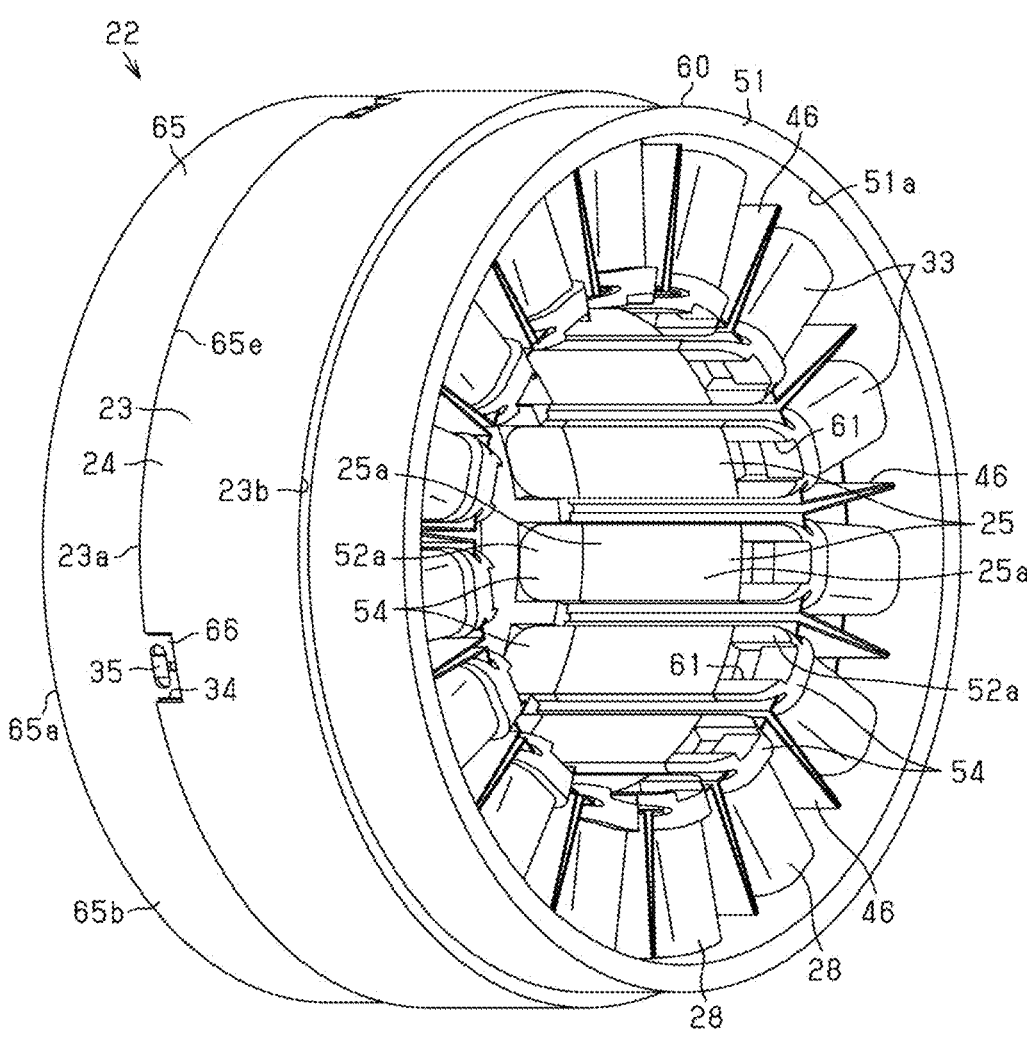
FIG. 8 is a perspective view of the stator without a second cover.
Figure 9:
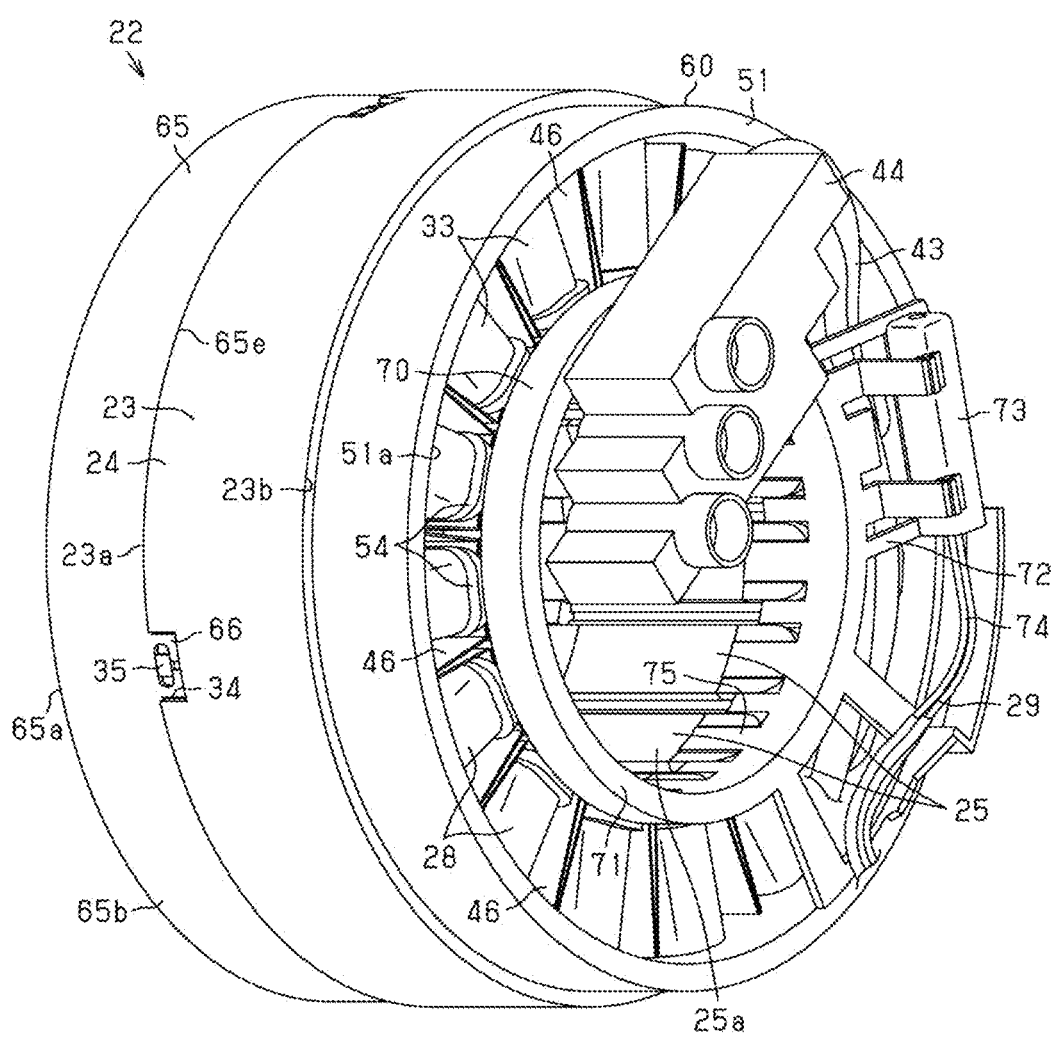
FIG. 9 is a perspective view of the stator with the second cover attached to the second insulator.

As illustrated in FIGS. 4, 5, 8, and 9, the stator 22 includes a first coil end 32 and a second coil end 33. As illustrated in FIGS. 4 and 5, the first coil end 32 is a part of the coil 28 and projects from the first core end surface 23a. As illustrated in FIGS. 8 and 9, the second coil end 33 is a part of the coil 28 and projects from the second core end surface 23b. That is, each of the first coil end 32 and the second coil end 33 serves as a coil end that is a part of the coil 28 and projects from the core end surface. That is, the coil 28 is formed of the wire 29 wound around the stator core 23 and has a coil end projecting from the core end surface of the stator core 23, which defines the stator core 23 in the axial direction of the yoke 24.

As illustrated in FIGS. 4, 5, 8, and 9, the coils 28 of the same phase are connected to each other by series winding. In series winding, the wire 29 of each phase is wound around the tooth extension portion 26, the insulator extension portion 53 of the first insulator 50, and the insulator extension portion 53 of the second insulator 60 through the slots 30 by concentrated-winding. The wire 29 of each phase is then wound around every third extension portions 26, 53 by concentrated-winding repeatedly and sequentially in the same way. This causes the coils 28 to be arranged in the circumferential direction of the stator core 23 every other two for each phase. In the present embodiment, the coils 28 include five coils 28 for each of the U phase, the V phase, and the W phase. The coils 28 are arranged such that the coils 28 of different phases are adjacent to each other in the circumferential direction of the stator core 23 in the slot 30. Accordingly, each of the coils 28 is formed of the wire 29 wound around the tooth extension portion 26, the insulator extension portion 53 of the first insulator 50, and the insulator extension portion 53 of the second insulator 60 through the slot 30.

As illustrated in FIGS. 4 and 5, the first insulator 50 electrically insulates the first core end surface 23a from the coils 28. The insulator base portion 51 of the first insulator 50 is located outward of the first coil ends 32 and overlaps the first coil ends 32 in the radial direction of the yoke 24. Each of the insulator inner walls 54 of the first insulator 50 is located inward of the corresponding first coil end 32 and overlaps the first coil end 32 in the radial direction of the yoke 24. That is, the insulator inner wall 54 of the first insulator 50 is located inward of the first coil end 32 in the radial direction of the yoke 24 such that the insulator inner wall 54 overlaps the tooth end portion 27 in the axial direction of the yoke 24 and overlaps the first coil end 32 in the radial direction of the yoke 24.

As illustrated in FIGS. 8 and 9, the second insulator 60 electrically insulates the second core end surface 23b from the coils 28. The insulator base portion 51 of the second insulator 60 is located outward of the second coil ends 33 and overlaps the second coil ends 33 in the radial direction of the yoke 24. Each of the insulator inner walls 54 of the second insulator 60 is located inward of the corresponding second coil end 33 and overlaps the second coil end 33 in the radial direction of the yoke 24. That is, the insulator inner wall 54 of the second insulator 60 is located inward of the second coil end 33 in the radial direction of the yoke 24 such that the insulator inner wall 54 overlaps the tooth end portion 27 in the axial direction of the yoke 24 and overlaps the second coil end 33 in the radial direction of the yoke 24.

As illustrated in FIG. 4, each wire 29 includes a connection wire 57 for each phase, which connects the coils 28 of the same phase in the circumferential direction of the stator core 23. The connection wire 57 is pulled out from the first coil end 32 of the coil 28 of the same phase, and guided to the corresponding guide groove 55 through the corresponding through groove 56.

Slot Insulating Member

As illustrated in FIG. 2, the stator 22 includes a plurality of slot insulating members 36. Each of the slot insulating members 36 serves as the first insulating member of the present disclosure. The slot insulating members 36 are each disposed in the corresponding one of the slots 30. Each of the slot insulating members 36 has a sheet shape. The slot insulating member 36 is formed by bending a strip-shaped insulation sheet such that the slot insulating member 36 extends along the inner peripheral surface 24a of the yoke 24 and the tooth side surfaces 26a adjacent to each other in the circumferential direction of the yoke 24. The slot insulating member 36 is disposed in the slot 30 such that the longitudinal direction of the slot insulating member 36 is aligned with the axial direction of the yoke 24. The slot insulating member 36 extends between the first core end surface 23*a* and the second core end surface 23*b* of the stator core 23, and protrudes from both of the first core end surface 23*a* and the second core end surface 23*b* along the axial direction. The slot insulating member 36 electrically insulates the stator core 23 from a part of the corresponding coil 28 in the slot 30.

Figure 10:
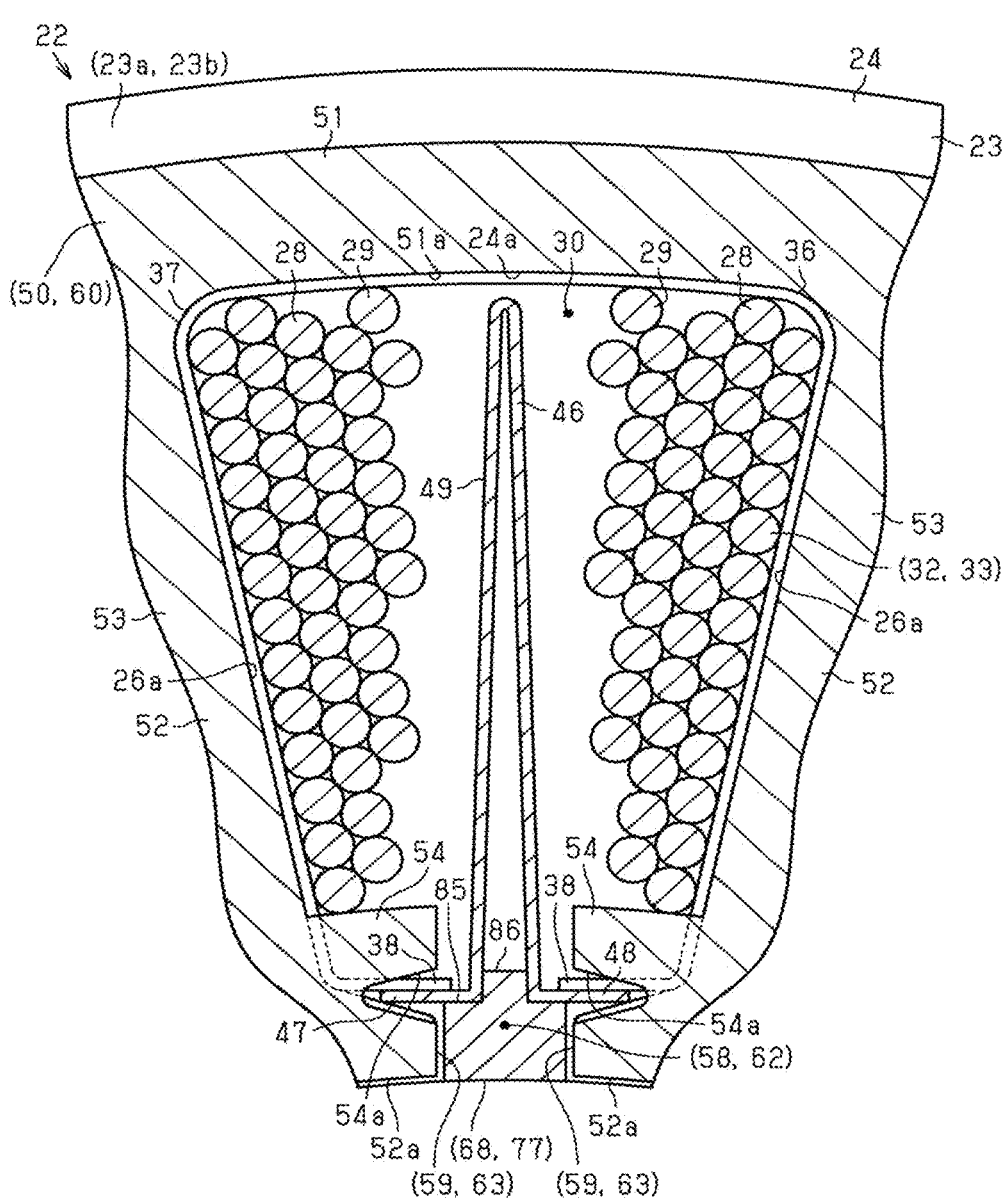
FIG. 10 is a fragmentary sectional view of the stator.

As illustrated in FIG. 10, the slot insulating member 36 has an insulation body 37. The insulation body 37 is a part of the slot insulating member 36 that extends along the inner peripheral surface 24*a* of the yoke 24 and the tooth side surfaces 26*a* adjacent to each other in the circumferential direction of the yoke 24. That is, the slot insulating member 36 extends along the inner peripheral surface 24*a* of the yoke 24 and the tooth side surfaces 26*a* adjacent to each other in the circumferential direction of the yoke 24.

Figure 11:
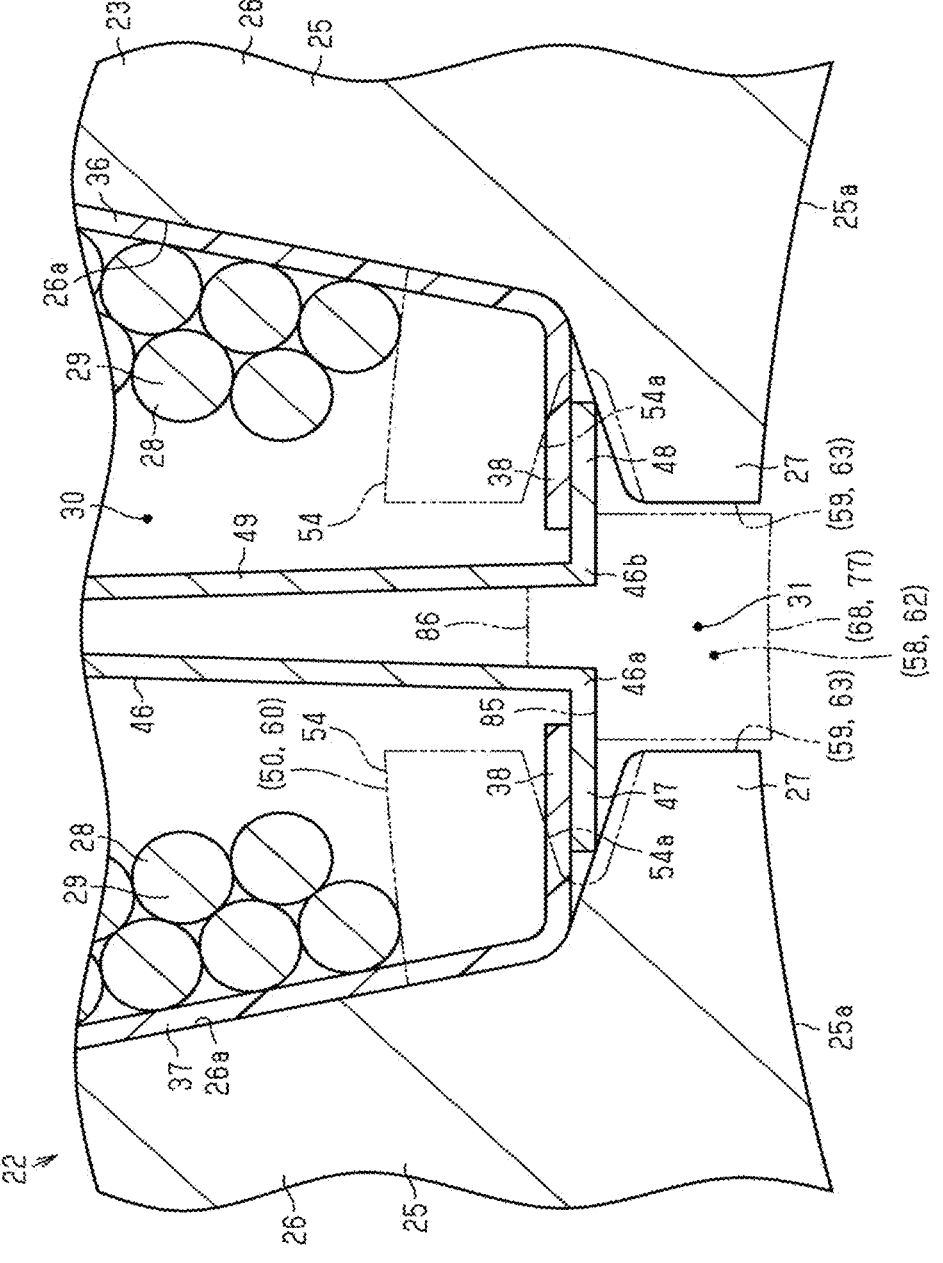
FIG. 11 is another fragmentary sectional view of the stator.

As illustrated in FIG. 11, the slot insulating member 36 further has a pair of extending portions 38. Both ends of the insulation body 37 are located distant from the inner peripheral surface 24*a* of the yoke 24, and the extending portions 38 respectively extend from both ends of the insulation body 37 such that the extending portions 38 approach each other. In other words, the extending 25 portions 38 respectively extend from the tooth side surfaces 26*a* adjacent to each other in the circumferential direction of the yoke 24 such that the extending portions 38 approach each other. The extending portions 38 electrically insulate the tooth end portions 27 between which the slot opening 31 is located from the corresponding coils 28. The extending portions 38 are separated from the tooth end portions 27.

Insulating Member

As illustrated in FIG. 2, the stator 22 includes a plurality of insulating members 46. Each of the insulating members 46 serves as the second insulating member of the present disclosure. The insulating members 46 are each disposed in the corresponding one of the slots 30. Each of the insulating members 46 has a sheet shape. The insulating member 46 is formed by bending a strip-shaped insulation sheet. The insulating member 46 is disposed in the slot 30 such that the longitudinal direction of the insulating member 46 is aligned with the axial direction of the yoke 24.

As illustrated in FIGS. 10 and 11, the insulating member 46 has a first insulating portion 47, a second insulating portion 48, and a third insulating portion 49. The first insulating portion 47 of the insulating member 46 is disposed between one of the adjacent tooth end portions 27 between which the slot opening 31 is located and one of the pair of extending portions 38 of the slot insulating member 36. The first insulating portion 47 of the insulating member 46 overlaps the one of the extending portions 38 in the radial direction of the yoke 24. The first insulating portion 47 electrically insulates the one of the adjacent tooth end portions 27 from one of the coils 28 adjacent to each other in the slot 30 in the circumferential direction of the yoke 24.

The second insulating portion 48 of the insulating member 46 is disposed between the other of the adjacent tooth end portions 27 between which the slot opening 31 is located and the other of the pair of extending portions 38 of the slot insulating member 36. The second insulating portion 48 of the insulating member 46 overlaps the other of the extending portions 38 in the radial direction of the yoke 24. Accordingly, the insulating member 46 overlaps the extending portions 38 in the radial direction of the yoke 24. The second insulating portion 48 electrically insulates the other of the adjacent tooth end portions 27 from the other of the coils 28 adjacent to each other in the slot 30 in the circumferential direction of the yoke 24.

The third insulating portion 49 has a V-shape in cross section. Specifically, the third insulating portion 49 extends from one end of the first insulating portion 47 adjacent to the second insulating portion 48 toward the inner peripheral surface 24*a* of the yoke 24, and is bent toward the second insulating portion 48 and connected to one end of the second insulating portion 48 adjacent to the first insulating portion 47. Accordingly, the third insulating portion 49 connects the first insulating portion 47 and the second insulating portion 48. In the slot 30, the third insulating portion 49 is disposed between the coils 28 adjacent to each other in the circumferential direction of the yoke 24. The third insulating portion 49 electrically insulates one of the adjacent coils 28 from the other of the adjacent coils 28 in the slot 30. Accordingly, the third insulating portion 49 has a V-shape in cross section to connect the first insulating portion 47 and the second insulating portion 48 and electrically insulate one of the coils 28 adjacent to each other in the circumferential direction of the yoke 24 from the other of the adjacent coils 28 in the slot 30.

In this way, the insulating member 46 is disposed crossing the slot opening 31 in the circumferential direction of the yoke 24. The insulating member 46 electrically insulates the tooth end portions 27 between which the slot opening 31 is located from the coils 28.

As illustrated in FIGS. 4 and 8, the opposite ends of the insulating member 46 in the longitudinal direction protrude from the slot 30 in the axial direction of the yoke 24. As illustrated in FIG. 10, a part of the first insulating portion 47 and a part of the second insulating portion 48 of the insulating member 46 protruding from the slot 30 in the axial direction of the yoke 24 are located in the space between the insulator inner walls 54 adjacent to each other in the circumferential direction of the yoke 24.

As illustrated in FIGS. 10 and 11, the insertion grooves 54*a* adjacent to each other in the circumferential direction of the yoke 24 cooperate to form a part of the space between the insulator inner walls 54 adjacent to each other in the circumferential direction of the yoke 24, and the first insulating portion 47 is inserted into one of the insertion grooves 54*a*. The second insulating portion 48 is inserted into the other of the insertion grooves 54*a* forming the part of the space between the insulator inner walls 54. In this way, the insulating member 46 protrudes from the slot 30 into the space between the insulator inner walls 54 adjacent to each other in the circumferential direction of the yoke 24.

First Cover

As illustrated in FIG. 5, the stator 22 includes a first cover 65 that serves as the cover of the present disclosure. The first cover 65 has a circular cylindrical shape. The first cover 65 has electrical insulation properties. The first cover 65 is made of a resin material, for example. The first cover 65 faces the first insulator 50.

The first cover 65 has an end wall 65*a*, an outer peripheral wall 65*b*, and an inner peripheral wall 65*c*. The end wall 65*a* has a ring shape. The end wall 65*a* has a plate shape. The outer peripheral wall 65*b* has an edge 65*e*, and has a circular cylindrical shape. The outer peripheral wall 65*b* extends from the outer peripheral portion of the end wall 65*a*, and is defined by the end wall 65*a* and the edge 65*e* in the axial direction. The inner peripheral wall 65*c* has a circular 20 cylindrical shape, and extends from the inner peripheral portion of the end wall 65*a*. The inner diameter of the outer peripheral wall 65*b* is greater than the outer diameter of the insulator base portion 51. The outer peripheral wall 65*b* surrounds the insulator base portion 51 of the first insulator 50. The inner peripheral wall 65*c* faces the insulator inner walls 54 of the first insulator 50 in the axial direction of the yoke 24. The end wall 65*a* faces the first coil ends 32 in the axial direction of the yoke 24. The end wall 65*a* has a plurality of insertion holes 65*h*.

As illustrated in FIG. 1, the outer peripheral wall 65*b* of the first cover 65 is disposed between the connection wire 57 and the peripheral wall 13*b* of the motor housing 13. The outer peripheral wall 65*b* of the first cover 65 electrically insulates the motor housing 13 from the connection wire 57.

As illustrated in FIG. 5, the first cover 65 has a plurality of engagement pieces 66 having a plate shape. Each of the engagement pieces 66 extends from the edge 65*e* of the outer peripheral wall 65*b* of the first cover 65 in the axial direction of the yoke 24. The engagement piece 66 has circumferentially outer side edges 66*a* that define the engagement piece 66 in the circumferential direction of the yoke 24. The engagement pieces 66 are equally spaced from each other in the circumferential direction of the outer peripheral wall 65*b* on the outer peripheral wall 65*b* of the first cover 65. The first cover 65 has, for example, four engagement pieces 66.

Figure 12:
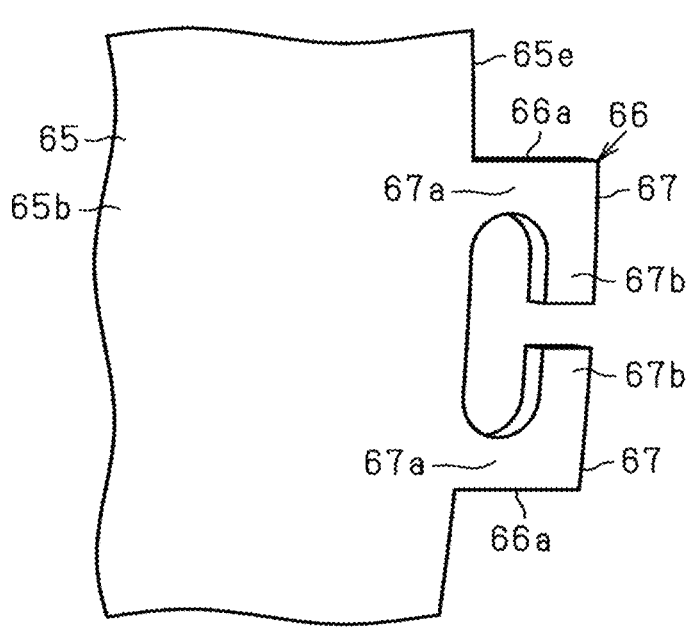
FIG. 12 is an enlarged perspective view of an engagement piece of the first cover.

As illustrated in FIG. 12, each of the engagement pieces 66 has a pair of engagement claws 67. Each of the engagement claws 67 has an extending piece 67*a* and a hook piece 67*b*. The extending piece 67*a* has an elongated flat plate shape. The extending piece 67*a* extends from the edge 65*e* of the outer peripheral wall 65*b* of the first cover 65 in the axial direction of the yoke 24. The longitudinal direction of the extending piece 67*a* corresponds to the axial direction of the yoke 24. The extending pieces 67*a* are parallel to each other. The hook piece 67*b* of one of the engagement claws 67 extends from the distal end of the corresponding extending piece 67*a* toward the hook piece 67*b* of the other of the engagement claws 67. The distal end of one of the hook pieces 67*b* faces the distal end of the other of the hook pieces 67*b* in the circumferential direction of the yoke 24. The distal ends of the hook pieces 67*b* are spaced from each other. Each side edge 66*a* of the engagement piece 66 is formed of one of the side edges of each extending piece 67*a*

Figure 13:
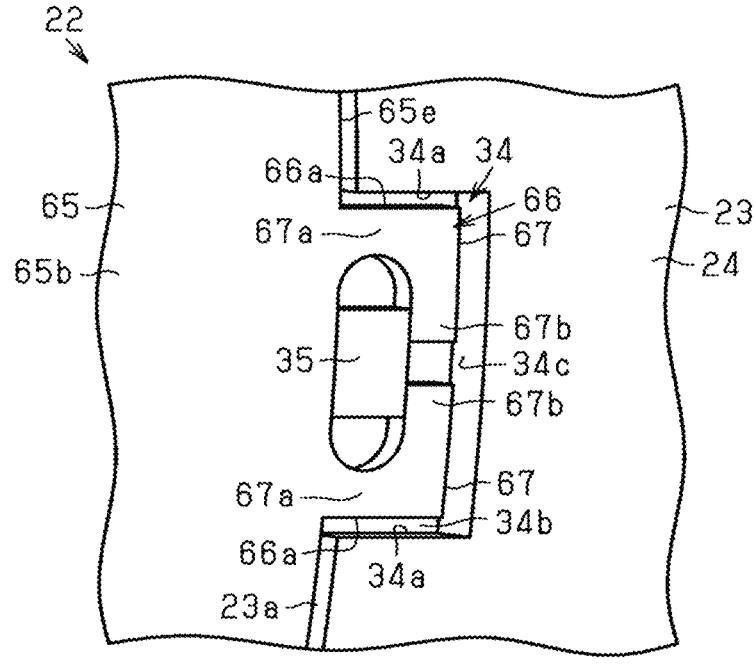
FIG. 13 is a perspective view of the engagement piece and the insertion recess for explaining the relationship between the engagement piece and the insertion recess.

As illustrated in FIG. 13, the engagement piece 66 is inserted into the corresponding insertion recess 34. The engagement piece 66 is inserted into the insertion recess 34 such that the protruding engagement portion 35 of the insertion recess 34 is located between the engagement claws 67. Accordingly, the engagement claws 67 engage with the protruding engagement portion 35. In such a way, the first cover 65 is attached to the stator core 23. The engagement of the protruding engagement portion 35 and the hook piece 67*b* of each engagement claw 67 prevents the engagement piece 66 from coming out of the insertion recess 34. Accordingly, the engagement of the hook piece 67*b* of the engagement claw 67 and the protruding engagement portion 35 restrains the first cover 65 from displacing relative to the first insulator 50 in the axial direction of the yoke 24. The hook piece 67*b* of the engagement claw 67 serves as the second engagement portion of the present disclosure that engages with the protruding engagement portion 35. That is, the engagement piece 66 has the second engagement portion of the present disclosure that engages with the protruding engagement portion 35 as the first engagement portion of the present disclosure.

Figure 14:
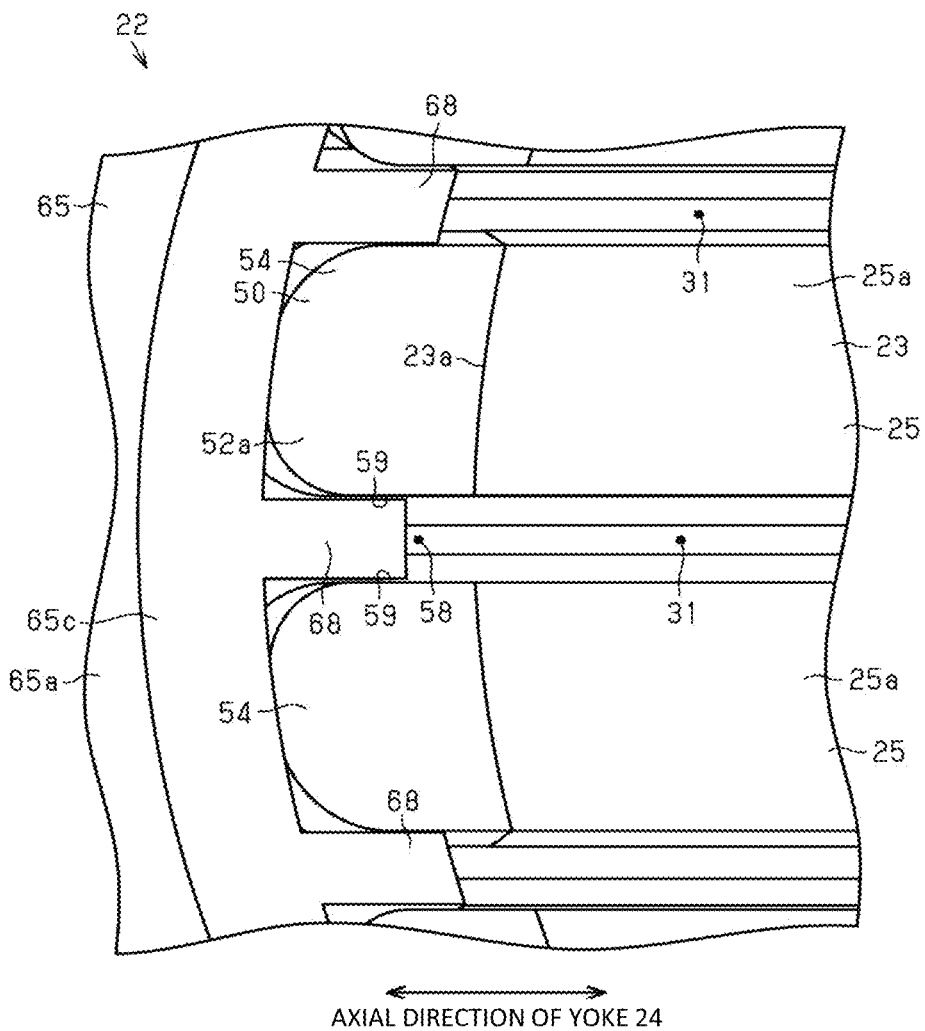
FIG. 14 is a perspective view of an insertion plate of the first cover.

As illustrated in FIGS. 5 and 14, the first cover 65 has a plurality of insertion plates 68. Each of the insertion plates 68 extends in the axial direction of the yoke 24 from the inner peripheral edge of the inner peripheral wall 65*c* of the first cover 65, which is the distant one of the edges of the inner peripheral wall 65*c* from the end wall 65*a*. The insertion plates 68 are equally spaced from each other in the circumferential direction of the inner peripheral wall 65*c*. Each of the insertion plates 68 has an elongated plate shape. The longitudinal direction of the insertion plate 68 corresponds to the axial direction of the yoke 24. The insertion plate 68 has side edges that define the insertion plate 68 in the circumferential direction of the yoke 24. The side edges of the insertion plate 68 extend in the axial direction of the yoke 24 and are parallel to each other. The insertion plate 68 is inserted into the space between the insulator inner walls 54 adjacent to each other in the circumferential direction of the yoke 24. Specifically, any two circumferentially adjacent insulator inner walls 54 of the first insulator 50 cooperate to have a pair of space-forming walls 59. One and the other of any two adjacent insulator inner walls 54 respectively have one and the other of the pair of space-forming walls 59. One of the pair of space-forming walls 59 is spaced from the other of the pair of space-forming walls 59 in the circumferential direction of the yoke 24, and cooperates with the other of the pair of space-forming walls 59 to define an insertion space 58 into which the insertion plate 68 is inserted. Accordingly, the insertion space 58 is the space between the insulator inner walls 54 adjacent to each other in the circumferential direction of the yoke 24. The pair of space-forming walls 59 are side walls of the insulator inner walls 54 that are adjacent to each other in the circumferential direction of the yoke 24. The insertion plate 68 is not disposed in a space between the teeth 25 adjacent to each other in the circumferential direction of the yoke 24, and is located away from the stator core 23 in the axial direction of the yoke 24.

Figure 15:
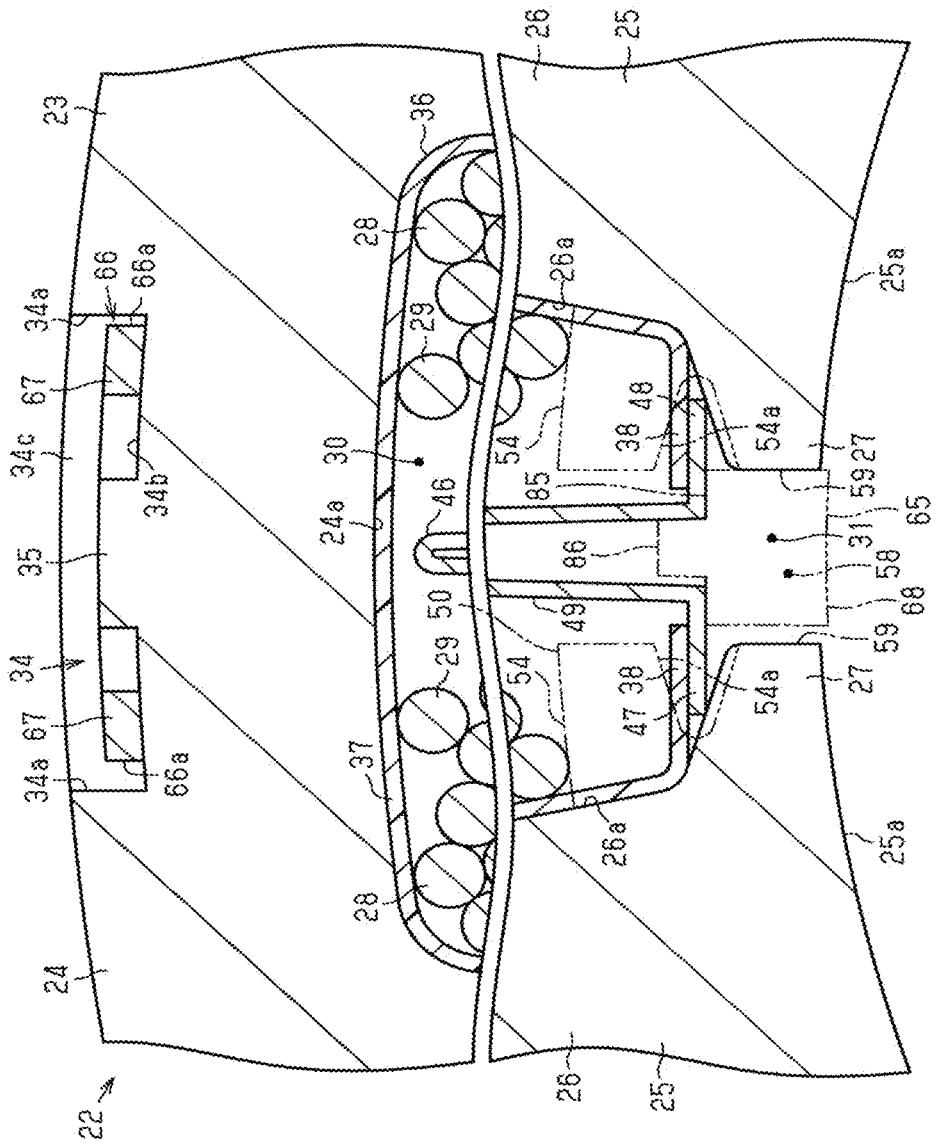
FIG. 15 is a sectional view of the insertion plate, a space-forming wall, the engagement piece, and the insertion recess for explaining the relationship among the insertion plate, the space-forming wall, the engagement piece, and the insertion recess.

As illustrated in FIG. 15, the insertion plate 68 is configured to come into contact with the pair of space-forming walls 59 with the insertion plate 68 inserted into the insertion space 58. In a situation that the insertion plate 68 is in contact with one of the pair of space-forming walls 59, a clearance is formed between each of the side edges 66*a* of the engagement piece 66 and the corresponding circumferential inner surface (i.e., the side surface 34*a*) of the insertion recess 34 in the circumferential direction of the yoke 24. Accordingly, the insertion plate 68 comes into contact with one of the pair of space-forming walls 59 to restrain the first cover 65 from displacing relative to the first insulator 50 in the circumferential direction of the yoke 24.

Second Cover

As illustrated in FIG. 9, the stator 22 includes a second cover 70 that serves as the cover of the present disclosure. The second cover 70 has an approximately circular cylindrical shape. The second cover 70 has electrical insulation properties. The second cover 70 is made of a resin material, for example. The second cover 70 is disposed on the opposite side of the second core end surface 23*b* with respect to the second coil end 33 in the axial direction of the yoke 24. The second cover 70 faces the second insulator 60.

The second cover 70 has a main body 71 having a circular cylindrical shape and an extending wall 72 having a plate shape. The main body 71 faces the insulator inner walls 54 of the second insulator 60 in the axial direction of the yoke 24. The extending wall 72 extends from a part of the outer peripheral edge of the main body 71 outward in the radial direction of the yoke 24. The extending wall 72 has a thin plate shape. The extending wall 72 has a storage 73 that has electrical insulation properties. The storage 73 has, for example, a rectangular cylindrical shape. The storage 73 stores a neutral point connector (not illustrated), which serves as a neutral point at which the ends of lead wires 74 for the U phase, the V phase, and the W phase drawn out from the second coil ends 33 are electrically connected to each other.

Figure 16:
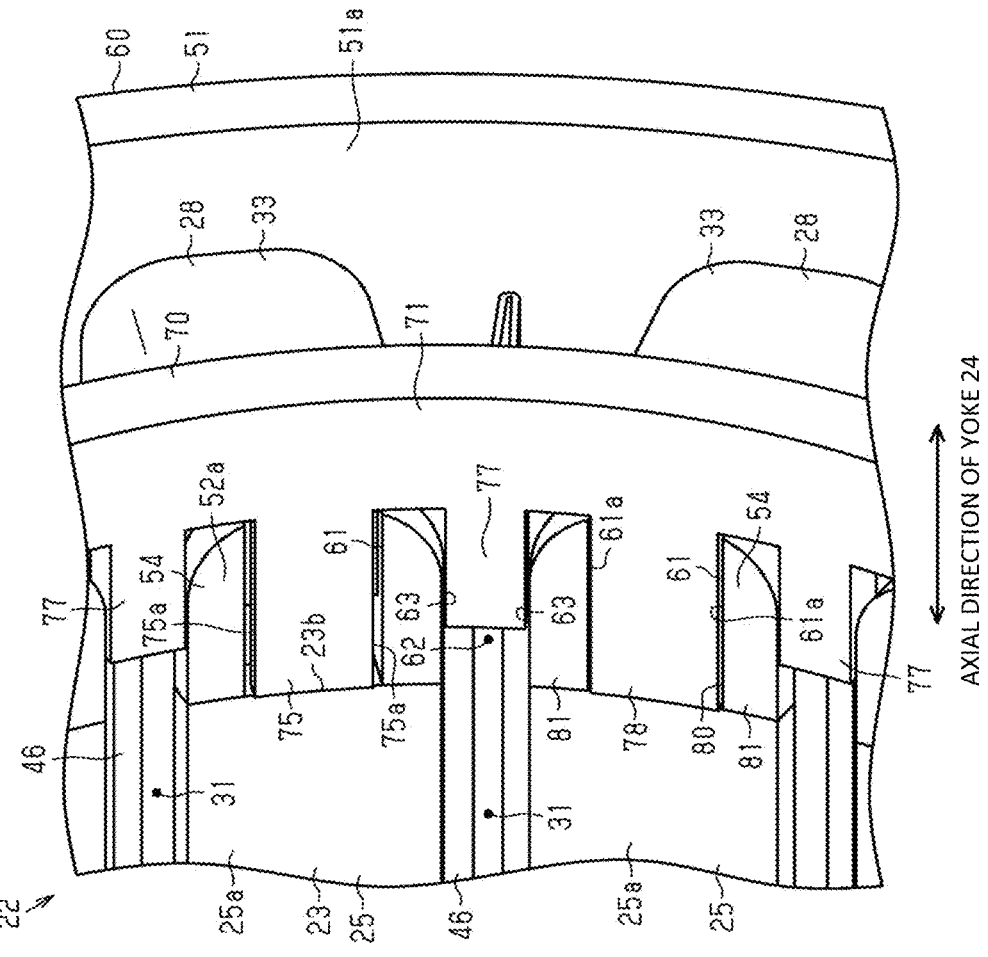
FIG. 16 is a perspective view of an insertion plate and an engagement piece of the second cover.

As illustrated in FIGS. 9 and 16, the second cover 70 has a plurality of engagement pieces 75 having a plate shape. Each of the engagement pieces 75 extends from the inner peripheral edge of the main body 71 of the second cover 70 in the axial direction of the yoke 24. The engagement pieces 75 are equally spaced from each other in the circumferential direction of the main body 71 on the main body 71 of the second cover 70.

Figure 17:
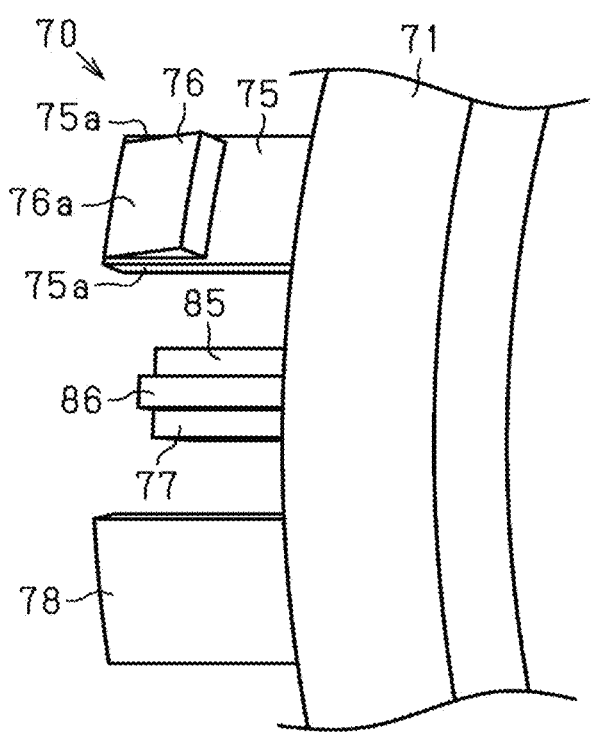
FIG. 17 is an enlarged perspective view of the insertion plate of the second cover and a protruding engagement portion.

As illustrated in FIG. 17, each of the engagement pieces 75 has an elongated plate shape. The longitudinal direction of the engagement piece 75 corresponds to the axial direction of the main body 71. The engagement piece 75 has side edges 75a that define the engagement piece 75 in the circumferential direction of the main body 71 (i.e., the circumferential direction of the yoke 24). The side edges 75a of the engagement piece 75 extend in the axial direction of the main body 71, and are parallel to each other.

The engagement piece 75 has a first engagement portion, which, in this embodiment, is a protruding engagement portion 76. The engagement piece 75 has a radially outer surface in the radial direction of the main body 71, and the protruding engagement portion 76 extends from the radially outer surface at the distal end of the engagement piece 75 in the radial direction of the yoke 24. The protruding engagement portion 76 has a sloped surface 76a, which is a radially outer surface of the protruding engagement portion 76 in the radial direction of the main body 71. The sloped surface 76a is inclined inward in the radial direction of the main body 71 toward the distal end of the engagement piece 75.

Figure 18:
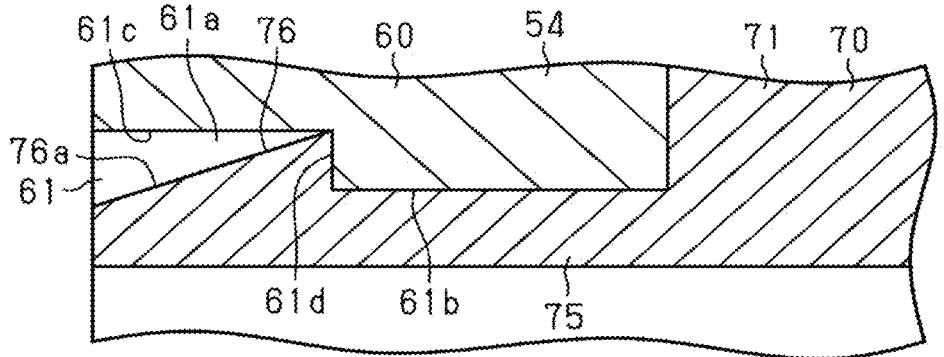
FIG. 18 is a sectional view of the engagement piece and the insertion recess for explaining the relationship between the engagement piece and the insertion recess.

As illustrated in FIG. 18, each engagement piece 75 is inserted into the corresponding insertion recess 61 of the insulator inner wall 54 of the second insulator 60. This causes the protruding engagement portion 76 to pass over the first connecting surface 61b of the insertion recess 61 and be disposed on the second connecting surface 61c of the insertion recess 61. The presence of the sloped surface 76a, which is the radially outer surface of the protruding engagement portion 76 in the radial direction of the main body 71, helps the protruding engagement portion 76 pass over the first connecting surface 61b. Furthermore, the engagement of the protruding engagement portion 76 and the third connecting surface 61d of the insertion recess 61 prevents the engagement piece 75 from coming out of the insertion recess 61. In such a way, the second cover 70 is attached to the second insulator 60. Accordingly, the engagement of the third connecting surface 61d of the insertion recess 61 and the protruding engagement portion 76 restrains the second cover 70 from displacing relative to the second insulator 60 in the axial direction of the yoke 24. The third connecting surface 61d of the insertion recess 61 serves as the second engagement portion of the present disclosure that engages with the protruding engagement portion 76. That is, the insertion recess 61 has the second engagement portion of the present disclosure that engages with the protruding engagement portion 76 as the first engagement portion of the present disclosure.

In this way, the second cover 70 has the engagement piece 75, and the insulator inner wall 54 of the second insulator 60 has the insertion recess 61. The second cover 70 is attached to the second insulator 60 with the circumferential direction and the axial direction of the main body 71 respectively corresponding to the circumferential direction and the axial direction of the yoke 24.

As illustrated in FIG. 16, the second cover 70 has a plurality of insertion plates 77. Each of the insertion plates 77 extends in the axial direction of the yoke 24 from the inner peripheral edge of the main body 71 of the second cover 70. The insertion plates 77 are equally spaced from each other in the circumferential direction of the main body 71 on the main body 71 of the second cover 70. Each of the insertion plates 77 has an elongated plate shape. The longitudinal direction of the insertion plate 77 corresponds to the axial direction of the yoke 24. The insertion plate 77 has side edges that define the insertion plate 77 in the circumferential direction of the yoke 24. The side edges of the insertion plate 77 extend in the axial direction of the yoke 24 and are parallel to each other. The insertion plate 77 is inserted into the space between the insulator inner walls 54 adjacent to each other in the circumferential direction of the yoke 24. Specifically, any two circumferentially adjacent insulator inner walls 54 of the second insulator 60 cooperate to have a pair of space-forming walls 63. One and the other of any two adjacent insulator inner walls 54 respectively have one and the other of the pair of space-forming walls 63. One of the pair of space-forming walls 63 is spaced from the other of the pair of space-forming walls 63 in the circumferential direction of the yoke 24, and cooperates with the other of the pair of space-forming walls 63 to define an insertion space 62 into which the insertion plate 77 is inserted. Accordingly, the insertion space 62 is the space between the insulator inner walls 54 adjacent to each other in the circumferential direction of the yoke 24. The pair of space-forming walls 63 are side walls of the insulator inner walls 54 that are adjacent to each other in the circumferential direction of the yoke 24. The insertion plate 77 is not disposed in a space between the teeth adjacent to each other in the circumferential direction of the yoke 24, and is located away from the stator core 23 in the axial direction of the yoke 24.

The second cover 70 has a plurality of insertion plates 78. Each of the insertion plates 78 extends in the axial direction of the yoke 24 from the inner peripheral edge of the main body 71 of the second cover 70. The insertion plates 78 are equally spaced from each other in the circumferential direction of the main body 71 on the main body 71 of the second cover 70. Each of the insertion plates 78 has an elongated plate shape. The longitudinal direction of the insertion plate 78 corresponds to the axial direction of the yoke 24. The insertion plate 78 has side edges that define the insertion plate 78 in the circumferential direction of the yoke 24. The side edges of the insertion plate 78 extend in the axial direction of the yoke 24 and are parallel to each other.

The insertion plate 78 is inserted into the insertion recess 61 into which the engagement piece 75 is not inserted. Specifically, the insertion plate 78 is inserted into an insertion space 80 that is defined by a pair of space-forming walls 81. The pair of space-forming walls 81 are spaced from each other in the circumferential direction of the yoke 24, and form the pair of side surfaces 61a of the insertion recesses 61 into which the engagement piece 75 is not inserted. Accordingly, any two circumferentially adjacent insulator inner walls 54 of the second insulator 60 cooperate to have the pair of space-forming walls 81. One and the other of any two adjacent insulator inner walls 54 respectively have one and the other of the pair of space-forming walls 81. One of the pair of space-forming walls 81 is spaced from the other of the pair of space-forming walls 81 in the circumferential direction of the yoke 24, and cooperates with the other of the pair of space-forming walls 81 to define the insertion space 80 into which the insertion plate 78 is inserted. The insertion plate 77 is not disposed in a space between the teeth 25 adjacent to each other in the circumferential direction of the yoke 24, and is located away from the stator core 23 in the axial direction of the yoke 24. The dimension of the insertion plate 78 is slightly greater than the dimension of the engagement piece 75 in the circumferential direction of the yoke 24.

In the main body 71 of the second cover 70, the engagement pieces 75, the insertion plates 77, and the insertion plates 78 are spaced from each other and arranged in the order of the engagement piece 75, the insertion plate 77, the insertion plate 78, the insertion plate 77, the insertion plate 78, the insertion plate 77, and the engagement piece 75 repeatedly in the circumferential direction of the main body 71, for example.

Figure 19:
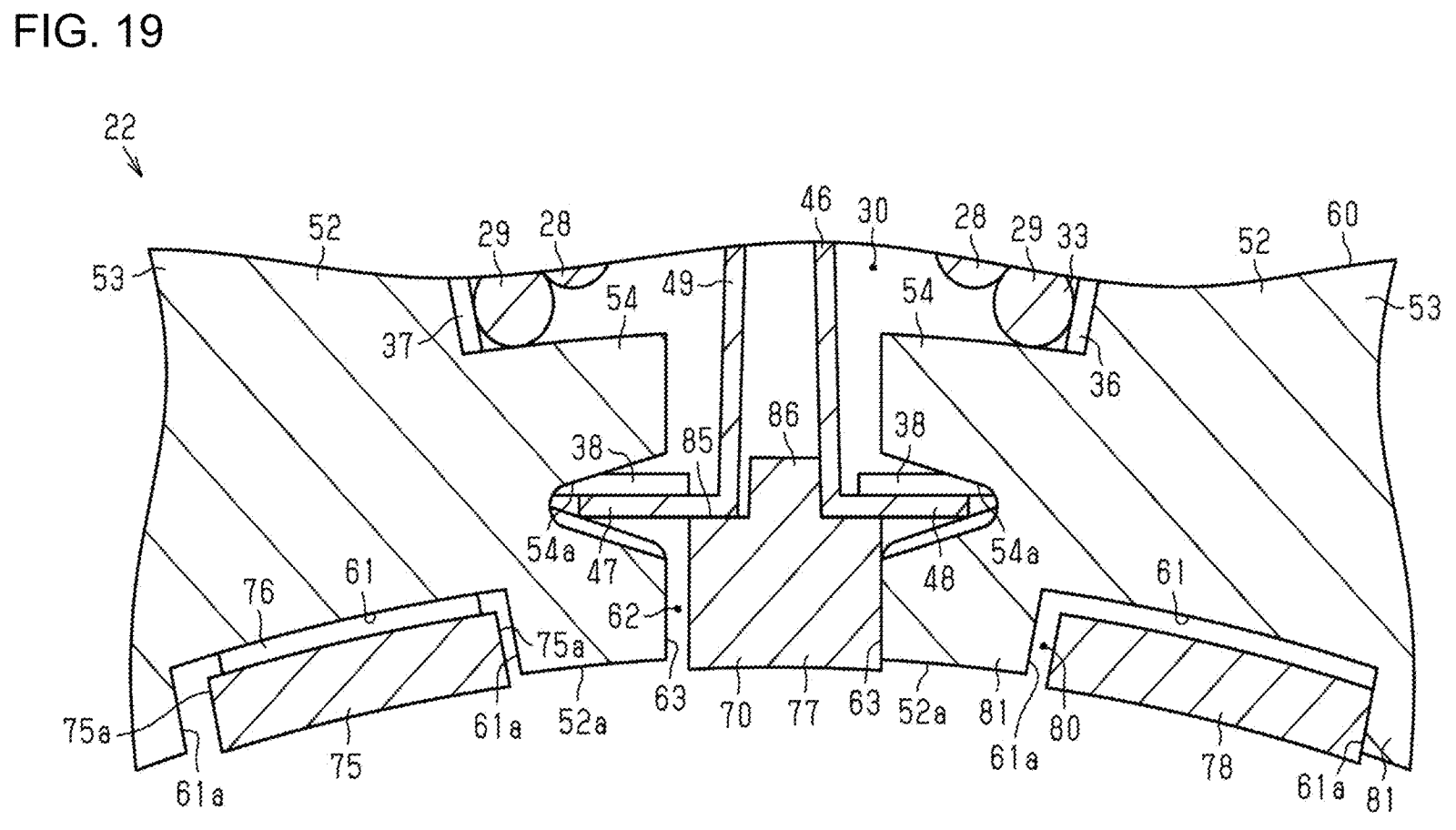

As illustrated in FIG. 19, the insertion plate 77 is configured to come into contact with the pair of space-forming walls 63 with the insertion plate 77 inserted into the insertion space 62. The insertion plate 78 is configured to come into contact with the pair of space-forming walls 81 with the insertion plate 78 inserted into the insertion recess 61. In a situation that the insertion plate 77 and the insertion plate 78 are respectively in contact with one of the pair of space-forming walls 63 and one of the pair of space-forming walls 81, a clearance is formed between each of the side edges 75a of the engagement piece 75 and its corresponding circumferential inner surface (i.e., the side surface 61a) of the insertion recess 61 in the circumferential direction of the yoke 24. Accordingly, the insertion plate 77 and the insertion plate 78 respectively come into contact with one of the pair of space-forming walls 63 and one of the pair of space-forming walls 81 to restrain the second cover 70 from displacing relative to the second insulator 60 in the circumferential direction of the yoke 24.

Support Surface

As illustrated in FIGS. 10 and 11, the insertion plate 68 and the insertion plate 77 each have a support surface 85 that is located in the space between the insulator inner walls 54 adjacent to each other in the circumferential direction of the yoke 24, and located inward of the insulating member 46 to support the insulating member 46 in the radial direction of the yoke 24. The support surface 85 of each of the insertion plate 68 and the insertion plate 77 is a radially outer surface of each of the insertion plate 68 and the insertion plate 77 in the radial direction of the yoke 24. As illustrated in FIG. 11, the support surface 85 is located radially outward of the slot opening 31 in the radial direction of the yoke 24 when viewed in the axial direction of the yoke 24. The support surface 85 of each of the insertion plate 68 and the insertion plate 77 supports a part of the first insulating portion 47 and a part of the second insulating portion 48 protruding from the slot 30 in the axial direction of the yoke 24 at a position adjacent to the third insulating portion 49.

Holding Portion

The insertion plate 68 and the insertion plate 77 each have a holding portion 86. The holding portion 86 of the insertion plate 68 projects outward in the radial direction of the yoke 24 from a center part of a radially outer surface of the insertion plate 68. The holding portion 86 of the insertion plate 77 projects outward in the radial direction of the yoke 24 from a center part of a radially outer surface of the insertion plate 77. The holding portion 86 of the insertion plate 68 is integrally formed with the insertion plate 68. The holding portion 86 of the insertion plate 77 is integrally formed with the insertion plate 77. Each holding portion 86 is disposed between the first insulating portion 47 and the second insulating portion 48 of the insulating member 46 in the circumferential direction of the yoke 24. The holding portion 86 is in contact with the opposite end portions of the third insulating portion 49 respectively adjacent to the first insulating portion 47 and the second insulating portion 48. The insulating member 46 has the first connecting point 46a, and the second connecting point 46b. The third insulating portion 49 is connected to the first insulating portion 47 at the first connecting point 46a and connected to the second insulating portion 48 at the second connecting point 46b. The holding portion 86 secures an opening angle of the third insulating portion 49, thereby ensuring a distance between the first connecting point 46a and the second connecting point 46b in the circumferential direction of the yoke 24.

Hermetic Terminal

As illustrated in FIG. 1, the electric compressor 10 includes a hermetic terminal 40. The hermetic terminal 40 has three conductive members 41 connected to the coils 28 of the U phase, the V phase, and the W phase. That is, the electric compressor 10 includes the conductive members 41. For the sake of explanation, FIG. 1 illustrates only one of the conductive members 41. Each of the conductive members 41 is a cylindrical metal terminal extending linearly. A first end of the conductive member 41 is electrically connected to the inverter 17 in the inverter chamber S1. A second end of the conductive member 41 protrudes into the motor housing 13 from the inverter chamber S1 through the hole 13h. The hermetic terminal 40 includes a support plate 42. The support plate 42 supports the three conductive members 41 with the conductive members 41 electrically insulated from each other. The support plate 42 is disposed on the outer surface of the end wall 13a of the motor housing 13 in the inverter chamber S1, and fixed in a vicinity of the hole 13h.

The stator 22 includes three lead wires 43 respectively for the U phase, the V phase, and the W phase. The lead wires 43 are drawn out from the rotating electric machine 20. In this embodiment, each of the lead wires 43 is drawn out from the second coil end 33 of any one of the coils 28 of the corresponding phase. For the sake of explanation, FIG. 1 illustrates only one of the three lead wires 43.

The stator 22 includes a cluster block 44. The cluster block 44 accommodates three connection terminals 45. The cluster block 44 has electrical insulation properties. The cluster block 44 is made of a resin material, for example. The cluster block 44 accommodates three connection terminals 45 respectively for the U phase, the V phase, and the W phase. Each of the conductive members 41 is electrically connected to the corresponding lead wire 43 via the corresponding connection terminal 45.

The inverter 17 supplies power to the rotating electric machine 20 via the conductive members 41, the connection terminals 45, and the lead wires 43. Accordingly, the rotating electric machine 20 is driven. In other words, the inverter 17 drives the rotating electric machine 20.

As illustrated in FIG. 9, the extending wall 72 of the second cover 70 holds the three lead wires 43 while pressing the lead wires 43 against the second coil ends 33. This allows the cluster block 44 to be aligned with the stator core 23.

Operation

The following will describe the operation of the stator of the rotating electric machine according to the present embodiment.

For example, when the rotating electric machine 20 vibrates, a friction occurs in the axial direction of the yoke 24 between the insertion plate 68 in the insertion space 58 and one of the pair of space-forming walls 59. The occurrence of the friction between the insertion plate 68 and one of the pair of space-forming walls 59 suppresses the friction between the engagement piece 66 and the insertion recess 34 in the axial direction of the yoke 24. Particularly, in a situation that the insertion plate 68 is in contact with one of the pair of space-forming walls 59, a clearance is formed between each of the circumferential side edges 66a of the engagement piece 66 and the circumference inner surface (i.e., the corresponding side surface 34a) of the insertion recess 34 in the circumferential direction of the yoke 24. This configuration prevents the occurrence of the friction between the side edge 66a of the engagement piece 66 and the corresponding side surface 34a of the insertion recess 34. This therefore suppresses the progression of the friction between the engagement piece 66 and the insertion recess 34. This therefore prevents a breakage of the engagement piece 66, thereby preventing disengagement of the protruding engagement portion 35 and the hook piece 67b of the engagement claw 67. This therefore prevents the first cover 65 from coming out of the first insulator 50 in the axial direction of the yoke 24.

Similarly, when the rotating electric machine 20 vibrates, a friction occurs in the axial direction of the yoke 24 between the insertion plate 77 in the insertion space 62 and one of the pair of space-forming walls 63 and between the insertion plate 78 in the insertion space 80 and one of the pair of space-forming walls 81. The occurrence of the friction between the insertion plate 77 in the insertion space 62 and one of the pair of space-forming walls 63 and between the insertion plate 78 in the insertion space 80 and one of the pair of space-forming walls 81 suppresses the friction between the engagement piece 75 and the insertion recess 61 in the axial direction of the yoke 24. Particularly, in a situation that the insertion plate 77 and the insertion plate 78 are respectively in contact with one of the pair of space-forming walls 63 and one of the pair of space-forming walls 81, a clearance is formed between each of the circumferential side edges 75a of the engagement piece 75 and the circumferential inner surface (i.e., the corresponding side surface 61a) of the insertion recess 61 in the circumferential direction of the yoke 24. This configuration prevents the occurrence of the friction between the side edge 75a of the engagement piece 75 and the corresponding side surface 61a of the insertion recess 61. This therefore suppresses the progression of the friction between the engagement piece 75 and the insertion recess 61. This therefore prevents a breakage of the engagement piece 75, thereby preventing disengagement of the protruding engagement portion 76 and the third connecting surface 61d of the insertion recess 61. This therefore prevents the second cover 70 from coming out of the second insulator 60 in the axial direction of the yoke 24.

The insertion plate 68 and the insertion plate 77 each have a support surface 85 that is located in the space between the insulator inner walls 54 adjacent to each other in the circumferential direction of the yoke 24, and located inward of the insulating member 46 to support the insulating member 46 in the radial direction of the yoke 24. The support surface 85 is located radially outward of the slot opening 31, which is disposed between the tooth end portions 27, in the radial direction of the yoke 24 when viewed in the axial direction of the yoke 24. This configuration restrains the insulating member 46 from approaching the slot opening 31. This configuration therefore easily secures an insulation distance between the tooth end portions 27 and the coils 28.

Advantageous Effects

The aforementioned embodiment provides the following advantageous effects. The following (5) to (7) will focus on advantageous effects related to the second cover 70, and will not elaborate advantageous effects related to the first cover 65 since they are the same as the advantageous effects related to the second cover 70.

(1) The insertion plate 68 and the insertion plate 77 each have the support surface 85 that is located in the space between the insulator inner walls 54 adjacent to each other in the circumferential direction of the yoke 24, and located inward of the insulating member 46 to support the insulating member 46 in the radial direction of the yoke 24. The support surface 85 is located radially outward of the slot opening 31, which is disposed between the tooth end portions 27, in the radial direction of the yoke 24 when viewed in the axial direction of the yoke 24. This configuration restrains the insulating member 46 from approaching the slot opening 31. This configuration therefore easily secures an insulation distance between the coils 28 and the tooth end portions 27 between which the slot opening 31 is located. This configuration therefore suppresses the occurrence of electric insulation failures between the tooth end portions 27 and the coils 28, thereby increasing the reliability of the stator 22 of the rotating electric machine 20.

(2) The insulating member 46 overlaps the extending portions 38 of the slot insulating member 36 in the radial direction of the yoke 24. This configuration easily allows extension of the insulation distance between the tooth end portions 27 and the coils 28, compared with a configuration in which the slot insulating member 36 does not have the extending portions 38. This configuration therefore further suppresses the occurrence of electric insulation failures between the tooth end portions 27 and the coils 28, thereby further increasing the reliability of the stator 22 of the rotating electric machine 20.

(3) The insulating member 46 has the first connecting point 46a, and the second connecting point 46b. The third insulating portion 49 is connected to the first insulating portion 47 at the first connecting point 46a and connected to the second insulating portion 48 at the second connecting point 46b. The insertion plate 68 and the insertion plate 77 each have the holding portion 86 that secures an opening angle of the third insulating portion 49. The holding portion 86 therefore secures a distance between the first connecting point 46a and the second connecting point 46b in the circumferential direction of the yoke 24. This configuration allows extension of the distance between the slot opening 31 and the distal edge of the first insulating portion 47 extending from the third insulating portion 49 and the distance between the slot opening 31 and the distal edge of the second insulating portion 48 extending from the third insulating portion 49 as much as possible. This configuration therefore easily allows extension of the insulation distance between the tooth end portions 27 and the coils 28. This configuration therefore further suppresses the occurrence of electric insulation failures between the tooth end portions 27 and the coils 28, thereby further increasing the reliability of the stator 22 of the rotating electric machine 20.

(4) Each of the insertion plate 68 and the insertion plate 77 is not disposed in a space between the teeth 25 adjacent to each other in the circumferential direction of the yoke 24, and is located away from the stator core 23 in the axial direction of the yoke 24. In this configuration, the support surface 85 of each of the insertion plate 68 and the insertion plate 77 is located inward of the insulating member 46 to support only a part of the insulating member 46 protruding from the slot 30 into a space between the circumferentially adjacent insulator inner walls 54. The insertion plate 68 and the insertion plate 77 are located away from the stator core 23. This configuration prevents contact and therefore prevents a friction between the insertion plates 68 and 77 and the stator core 23, for example, when the rotating electric machine 20 vibrates. This configuration therefore increases durability of the stator 22 of the rotating electric machine 20, thereby further increasing the reliability of the stator 22 of the rotating electric machine 20.

(5) The second cover 70 has the insertion plate 77 and the insertion plate 78 extending in the axial direction of the yoke 24. Any two circumferentially adjacent insulator inner walls 54 of the second insulator 60 cooperate to have the pair of space-forming walls 63. One and the other of any two adjacent insulator inner walls 54 respectively have one and the other of the pair of space-forming walls 63. One of the pair of space-forming walls 63 is spaced from the other of the pair of space-forming walls 63 in the circumferential direction of the yoke 24, and cooperates with the other of the pair of space-forming walls 63 to define the insertion space 62 into which the insertion plate 77 is inserted. Furthermore, any two circumferentially adjacent insulator inner walls 54 of the second insulator 60 cooperate to have the pair of space-forming walls 81. One and the other of any two adjacent insulator inner walls 54 respectively have one and the other of the pair of space-forming walls 81. One of the pair of space-forming walls 81 is spaced from the other of the pair of space-forming walls 81 in the circumferential direction of the yoke 24, and cooperates with the other of the pair of space-forming walls 81 to define the insertion space 80 into which the insertion plate 78 is inserted. The insertion plate 77 is configured to come into contact with the pair of space-forming walls 63 with the insertion plate 77 inserted into the insertion space 62. The insertion plate 78 is configured to come into contact with the pair of space-forming walls 81 with the insertion plate 78 inserted into the insertion space 80. For example, when the rotating electric machine 20 vibrates, a friction occurs in the axial direction of the yoke 24 between the insertion plate 77 in the insertion space 62 and one of the pair of space-forming walls 63 and between the insertion plate 78 in the insertion space 80 and one of the pair of space-forming walls 81. The occurrence of the friction between the insertion plate 77 in the insertion space 62 and one of the pair of space-forming walls 63 and between the insertion plate 78 in the insertion space 80 and one of the pair of space-forming walls 81 suppresses the friction between the engagement piece 75 and the insertion recess 61 in the axial direction of the yoke 24. This therefore suppresses the progression of the friction between the engagement piece 75 and the insertion recess 61. This therefore prevents a breakage of the engagement piece 75, thereby preventing disengagement of the protruding engagement portion 76 and the third connecting surface 61d of the insertion recess 61. This therefore prevents the second cover 70 from coming out of the second insulator 60 in the axial direction of the yoke 24. As a result, this increases the reliability of the stator 22 of the rotating electric machine 20.

(6) In a situation that the insertion plate 77 and the insertion plate 78 are respectively in contact with one of the pair of space-forming walls 63 and one of the pair of space-forming walls 81, a clearance is formed between each of the circumferential side edges 75a of the engagement piece 75 and the circumferential inner surface (i.e., the corresponding the side surface 61a) of the insertion recess 61 in the circumferential direction of the yoke 24. This configuration prevents the occurrence of the friction between the side edge 75a of the engagement piece 75 and the corresponding side surface 61a of the insertion recess 61.

(7) The insertion space 62 is a space between the insulator inner walls 54 adjacent to each other in the circumferential direction of the yoke 24. The pair of space-forming walls 63 are side walls of the insulator inner walls 54 that are adjacent to each other in the circumferential direction of the yoke 24. This configuration allows the progression of the friction between the engagement piece 75 and the insertion recess 61 to be suppressed simply by the presence of the insertion plate 77 inserted into the space between the insulator inner walls 54 adjacent to each other in the circumferential direction of the yoke 24. This therefore simplifies the configuration of the stator 22.

(8) The second cover 70 has the engagement piece 75, and the insulator inner wall 54 of the second insulator 60 has the insertion recess 61. The insertion plate 77, the pair of space-forming walls 63, the engagement piece 75, and the insertion recess 61 are located radially inward of the second coil end 33 in the radial direction of the yoke 24. This configuration allows the engagement piece 75 and the insertion recess 61 to be located as close to the insertion plate 77 and the pair of space-forming walls 63 as possible, compared with a configuration in which the engagement piece 75 and the insertion recess 61 are located radially outward of the second coil end 33 in the radial direction of the yoke 24. This configuration is unlikely to cause tolerance accumulation of the engagement piece 75, the insertion recess 61, the insertion plate 77, and the pair of space-forming walls 63. This configuration therefore suitably suppresses a friction between the engagement piece 75 and the insertion recess 61 caused by a friction between the insertion plate 77 and the space-forming wall 63.

Modifications

The aforementioned embodiment may be modified as below. The embodiment and the following modifications may be combined with each other within technically consistent range.

Figure 20:
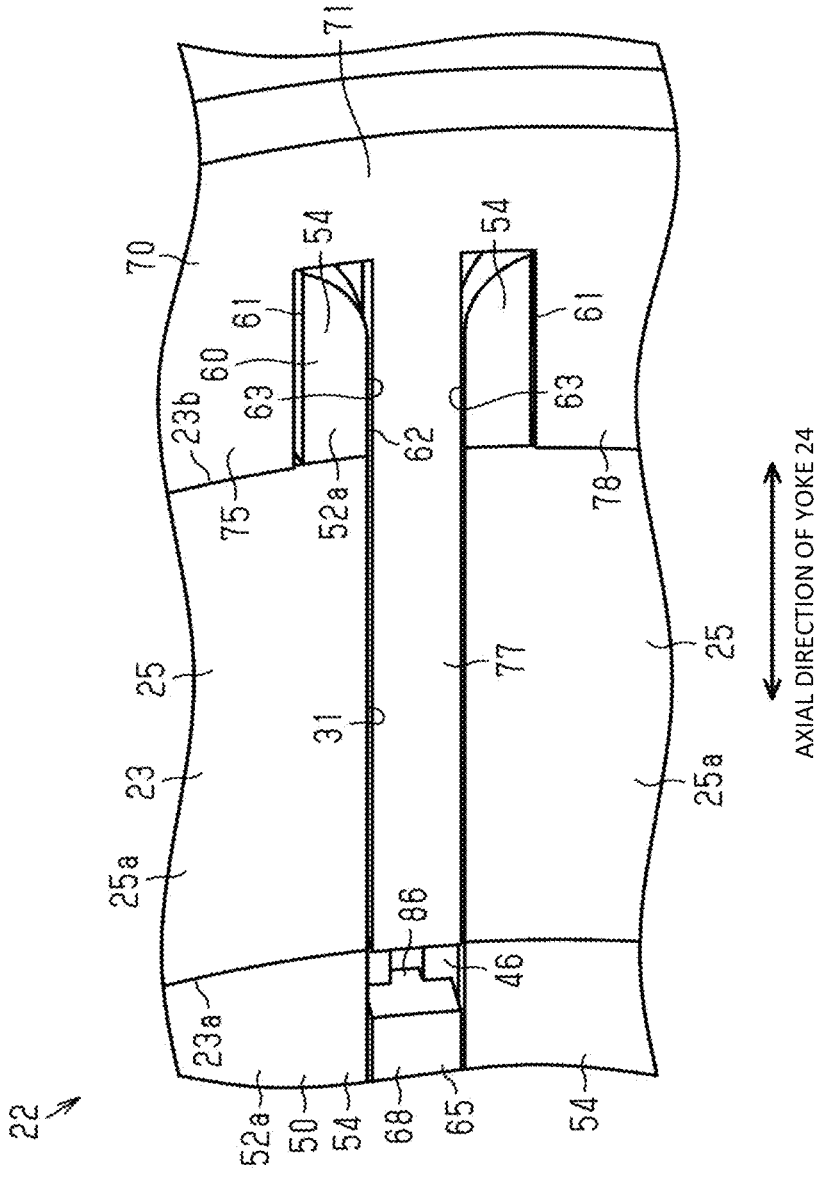
FIG. 20 is a perspective view of an insertion plate of a modification.

As illustrated in FIG. 20, for example, the insertion plate 77 may be inserted into the space between the adjacent teeth 25 in the circumferential direction of the yoke 24 through the space between the adjacent insulator inner walls 54 in the circumferential direction of the yoke 24. According to this configuration, the support surface 85 of the insertion plate 77 is located inward of the insulating member 46 to support a part of the insulating member 46 located in the slot 30, in addition to the part of the insulating member 46 protruding into a space between the circumferentially adjacent insulator inner walls 54. Accordingly, the support surface 85 of the insertion plate 77 is located inward of the insulating member 46 to stably support the insulating member 46 in the radial direction of the yoke 24. This configuration therefore further restrains the insulating member 46 from approaching the slot opening 31. This configuration therefore further easily secures the insulation distance between the coils 28 and the tooth end portions 27 between which the slot opening 31 is located. This configuration therefore further suppresses the occurrence of electric insulation failures between the tooth end portions 27 and the coils 28, thereby further increasing the reliability of the stator 22 of the rotating electric machine 20.

In the present embodiment, the second cover 70 may be provided without the plurality of insertion plates 78.

In the present embodiment, for example, each of the insulator inner walls 54 of the second insulator 60 may have an engagement piece, and the second cover 70 may have an insertion recess into which the engagement piece is inserted. That is, in this configuration, one of the cover and the insulator inner wall 54 needs to have an engagement piece, and the other of the cover and the insulator inner wall 54 needs to have an insertion recess into which the engagement piece is inserted.

In the present embodiment, the insulator inner wall 54 of the second insulator 60 may be provided without the insertion recess 61. In this configuration, the insulator base portion 51 of the second insulator 60 may have an insertion recess, for example. In this configuration, the engagement piece 75 extends from the main body 71 outward in the radial direction of the main body 71 so that the engagement piece 75 is inserted to an insertion recess formed in the insulator base portion 51 of the second insulator 60.

In the present embodiment, for example, the second insulator 60 may have an engagement piece having a plate shape, and the second cover 70 may have an insertion recess into which the engagement piece is inserted. That is, one of the cover and the insulator needs to have an engagement piece having a plate shape, and the other of the cover and the insulator needs to have an insertion recess into which the engagement piece is inserted.

In the present embodiment, for example, the yoke 24 may have an engagement piece having a plate shape, and the first cover 65 may have an insertion recess into which the engagement piece is inserted. That is, one of the cover and the yoke 24 needs to have an engagement piece having a plate shape, and the other of the cover and the yoke 24 needs to have an insertion recess into 20 which the engagement piece is inserted. That is, one of the cover and the insulator needs to have an engagement piece having a plate shape and the other of the cover and the insulator needs to have an insertion recess into which the engagement piece is inserted, or one of the cover and the yoke needs to have an engagement piece having a plate shape and the other of the cover and the yoke needs to have an insertion recess into which the engagement piece is inserted. In this configuration, one of the engagement piece and the insertion recess needs to have a protruding engagement portion as the first engagement portion, and the other of the engagement piece and the insertion recess needs to have the second engagement portion. The second engagement portion of the other of the engagement piece and the insertion recess may be a projection or recess.

In the present embodiment, the engagement pieces 66 may not be equally spaced from each other in the circumferential direction. The same applies to the engagement pieces 75, the insertion recesses 34, and the insertion recesses 61.

In the present embodiment, the insertion plates 68 may not be equally spaced from each other in the circumferential direction. The same applies to the insertion plates 77 and the insertion plates 78.

In the present embodiment, each slot insulating member 36 may be provided without the pair of extending portions 38.

In the present embodiment, the slot insulating member 36 may be a resin layer integrally formed with the inner peripheral surface 24a of the yoke 24 and the tooth side surfaces 26a adjacent to each other in the circumferential direction of the yoke 24.

In the present embodiment, the insulating member 46 has the first insulating portion 47, the second insulating portion 48, and the third insulating portion 49 and has a V-shape in cross section. However, the shape of the insulating member 46 is not limited thereto. The insulating member 46 may have a flat-plate shape such that the insulating member 46 is disposed in the slot 30 and crosses the slot opening 31 in the circumferential direction of the yoke 24. The insulating member 46 having a flat-plate shape electrically insulates the tooth end portions 27 between which the slot opening 31 is located from the coils 28. That is, the insulating member 46 needs to electrically insulate the tooth end portions 27 from the coils 28, but the shape of the insulating member 46 is not particularly limited.

In the present embodiment, the insulating member 46 is formed of a bendable insulation sheet, but not limited thereto. The insulating member 46 may be formed of a molded member, for example.

In the present embodiment, each of the insertion plate 68 and the insertion plate 77 may be provided without the holding portion 86.

In the present embodiment, the compression part 16 is not limited to a scroll compression part. The compression part 16 may be a compression part, such as a piston compression part or a vane compression part.

In the present embodiment, the electric compressor 10 is applicable to a vehicle air conditioner, but not limited thereto. For example, the electric compressor 10 may be mounted to a fuel cell vehicle, and is configured to cause the compression part 16 to compress air, as a fluid supplied to a fuel cell.

APPENDIX

The aforementioned embodiment includes configurations described in the following appendices.

APPENDIX 1

A stator of a rotating electric machine, the stator comprising:

a stator core including a yoke having a cylindrical shape and having a core end surface defining the stator core in an axial direction of the yoke, the stator core including a plurality of teeth each extending from an inner peripheral surface of the yoke inward in a radial direction of the yoke, the stator core having a slot between the teeth adjacent to each other in a circumferential direction of the 20 yoke, each of the plurality of teeth having:

a tooth extension portion extending from the inner peripheral surface of the yoke and having tooth side surfaces that define the tooth extension portion in the circumferential direction of the yoke; and a tooth end portion extending from the tooth side surfaces of the tooth extension portion along the circumferential direction of the yoke;

a plurality of coils each formed of a wire wound around the stator core, each of the coils having a coil end projecting from the core end surface of the stator core;

an insulator facing the core end surface of the stator core, and electrically insulating the core end surface from the coil end, the insulator having:

an insulator base portion having a cylindrical shape and located outward of the coil end and overlapping the coil end in the radial direction of the yoke;

a plurality of insulator extension portions each extending from an inner peripheral surface of the insulator base portion inward in a radial direction of the insulator base portion, and overlapping the corresponding tooth extension portion in the axial direction of the yoke; and a plurality of insulator inner walls each extending from the corresponding insulator extension portion, each of the insulator inner walls being located inward of the coil end in the radial direction of the yoke such that the insulator inner wall overlaps the corresponding tooth end portion in the axial direction of the yoke and overlaps the coil end in the radial direction of the yoke; and a cover facing the insulator, wherein the coil is formed of the wire wound around the tooth extension portion and the insulator extension portion through the slot, wherein the stator includes:

a first insulating member that extends along an inner peripheral surface of the yoke and the tooth side surfaces adjacent to each other in the circumferential direction of the yoke, and electrically insulates the stator core from the coil in the slot; and a second insulating member that is disposed crossing a slot opening between the tooth end portions adjacent to each other in the circumferential direction of the yoke, and electrically insulates the tooth end portions from the coils, wherein the cover has an insertion plate extending in the axial direction of the yoke, the insertion plate has a support surface that is located in a space between the insulator inner walls adjacent to each other in the circumferential direction of the yoke and located inward of the second insulating member to support the second insulating member in the radial direction of the yoke, and the support surface is located outward of the slot opening in the radial direction of the yoke when viewed in the axial direction of the yoke.

APPENDIX 2

The stator of the rotating electric machine according to Appendix 1, wherein the first insulating member has a pair of extending portions, the extending portions respectively extend from the tooth side surfaces adjacent to each other in the circumferential direction of the yoke such that the extending portions approach each other and electrically insulate the tooth end portions from the coils, and the extending portions overlap the second insulating member in the radial direction of the yoke.

APPENDIX 3

The stator of the rotating electric machine according to Appendix 1 or 2, wherein the second insulating member has a first insulating portion, a second insulating portion, and a third insulating portion, wherein the first insulating portion electrically insulates one of the adjacent tooth end portions from one of the coils adjacent to each other in the slot in the circumferential direction of the yoke, the second insulating portion electrically insulates the other of the adjacent tooth end portions from the other of the coils adjacent to each other in the slot in the circumferential direction of the yoke, and the third insulating portion has a V-shape in cross section to connect the first insulating portion and the second insulating portion and electrically insulate the one of the coils adjacent to each other in the circumferential direction of the yoke from the other of the adjacent coils in the slot, the second insulating member has a first connecting point at which the first insulating portion is connected to the third insulating portion and a second connecting point at which the second insulating portion is connected to the third insulating portion, and the insertion plate has a holding portion that secures an opening angle of the third insulating portion to secure a distance between the first connecting point and the second connecting point in the circumferential direction of the yoke.

APPENDIX 4

The stator of the rotating electric machine according to any one of Appendices 1 to 3, wherein the insertion plate is not disposed in a space between the teeth adjacent to each other in the circumferential direction of the yoke, and is located away from the stator core in the axial direction of the yoke.

APPENDIX 5

The stator of the rotating electric machine according to any one of Appendices 1 to 3, wherein the insertion plate is inserted into the space between the adjacent teeth in the circumferential direction of the yoke through the space between the adjacent insulator inner walls in the circumferential direction of the yoke.

What is claimed is:

1. A stator of a rotating electric machine, the stator comprising:

a stator core including a yoke having a cylindrical shape and having a core end surface defining the stator core in an axial direction of the yoke, the stator core including a plurality of teeth each extending from an inner peripheral surface of the yoke inward in a radial direction of the yoke, the stator core having a slot between the teeth adjacent to each other in a circumferential direction of the yoke, each of the plurality of teeth having:

a tooth extension portion extending from the inner peripheral surface of the yoke and having tooth side surfaces that define the tooth extension portion in the circumferential direction of the yoke; and a tooth end portion extending from the tooth side surfaces of the tooth extension portion along the circumferential direction of the yoke;

a plurality of coils each formed of a wire wound around the stator core, each of the coils having a coil end projecting from the core end surface of the stator core;

an insulator facing the core end surface of the stator core, and electrically insulating the core end surface from the coil end, the insulator having:

an insulator base portion having a cylindrical shape and located outward of the coil end and overlapping the coil end in the radial direction of the yoke;

a plurality of insulator extension portions each extending from an inner peripheral surface of the insulator base portion inward in a radial direction of the insulator base portion, and overlapping the corresponding tooth extension portion in the axial direction of the yoke; and a plurality of insulator inner walls each extending from the corresponding insulator extension portion, each of the insulator inner walls being located inward of the coil end in the radial direction of the yoke such that the insulator inner wall overlaps the corresponding tooth end portion in the axial direction of the yoke and overlaps the coil end in the radial direction of the yoke; and a cover facing the insulator, wherein the coil is formed of the wire wound around the tooth extension portion and the insulator extension portion through the slot, wherein the stator includes:

a first insulating member that extends along an inner peripheral surface of the yoke and the tooth side surfaces adjacent to each other in the circumferential direction of the yoke, and electrically insulates the stator core from the coil in the slot; and a second insulating member that is disposed crossing a slot opening between the tooth end portions adjacent to each other in the circumferential direction of the yoke, and electrically insulates the tooth end portions from the coils, wherein the cover has an insertion plate extending in the axial direction of the yoke, the insertion plate has a support surface that is located in a space between the insulator inner walls adjacent to each other in the circumferential direction of the yoke and located inward of the second insulating member to support the second insulating member in the radial direction of the yoke, and the support surface is located outward of the slot opening in the radial direction of the yoke when viewed in the axial direction of the yoke.

2. The stator of the rotating electric machine according to claim 1, wherein the first insulating member has a pair of extending portions, the extending portions respectively extend from the tooth side surfaces adjacent to each other in the circumferential direction of the yoke such that the extending portions approach each other and electrically insulate the tooth end portions from the coils, and the extending portions overlap the second insulating member in the radial direction of the yoke.

3. The stator of the rotating electric machine according to claim 1, wherein the second insulating member has a first insulating portion, a second insulating portion, and a third insulating portion, wherein the first insulating portion electrically insulates one of the adjacent tooth end portions from one of the coils adjacent to each other in the slot in the circumferential direction of the yoke, the second insulating portion electrically insulates the other of the adjacent tooth end portions from the other of the coils adjacent to each other in the slot in the circumferential direction of the yoke, and the third insulating portion has a V-shape in cross section to connect the first insulating portion and the second insulating portion and electrically insulate the one of the coils adjacent to each other in the circumferential direction of the yoke from the other of the adjacent coils in the slot, the second insulating member has a first connecting point at which the first insulating portion is connected to the third insulating portion and a second connecting point at which the second insulating portion is connected to the third insulating portion, and the insertion plate has a holding portion that secures an opening angle of the third insulating portion to secure a distance between the first connecting point and the second connecting point in the circumferential direction of the yoke.

4. The stator of the rotating electric machine according to claim 1, wherein the insertion plate is not disposed in a space between the teeth adjacent to each other in the circumferential direction of the yoke, and is located away from the stator core in the axial direction of the yoke.

5. The stator of the rotating electric machine according to claim 1, wherein the insertion plate is inserted into the space between the adjacent teeth in the circumferential direction of the yoke through the space between the adjacent insulator inner walls in the circumferential direction of the yoke.

* * * * *